US012718130B2

(12) United States Patent
Kanazawa et al.

(10) Patent No.: US 12,718,130 B2
(45) Date of Patent: Aug. 25, 2026

(54) SCALABLE ANALOG ZERO NOISE EXTRAPOLATION BY ECHO EXTENSION

(71) Applicant: International Business Machines Corporation, Armonk, NY (US)

(72) Inventors: Naoki Kanazawa, Yokohama (JP); Daniel Josef Egger, Zurich (CH); Kento Ueda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 805 days.

(21) Appl. No.: 18/299,178

(22) Filed: Apr. 12, 2023

(65) Prior Publication Data

US 2024/0346353 A1 Oct. 17, 2024

(51) Int. Cl.
*G06N 10/40* (2022.01)

(52) U.S. Cl.
CPC .................................... *G06N 10/40* (2022.01)

(58) Field of Classification Search
CPC ...................................................... G06N 10/40
See application file for complete search history.

(56) References Cited

U.S. PATENT DOCUMENTS

2020/0175409 A1 6/2020 Kandala et al.
2022/0179732 A1 6/2022 Egger et al.

FOREIGN PATENT DOCUMENTS

CN 113098803 A 7/2021
WO 2022231846 A1 11/2022

OTHER PUBLICATIONS

Gokhale, et al., "Optimized Quantum Compilation for Near-Term Algorithms with OpenPulse," arXiv:2004.11205v2 [quant-ph] May 9, 2020.
Giurgica-Tiron, et al., "Digital zero noise extrapolation for quantum error mitigation," arXiv:2005.10921v2 [quant-ph] Jan. 14, 2021.
Liang, et al., "Variational Quantum Pulse Learning," arXiv:2203.17267v3 [quant-ph] Aug. 6, 2022.
Schultz, et al., "Analyzing the impact of time-correlated noise on zero-noise extrapolation," arXiv:2201.11792v3 [quant-ph] Sep. 9, 2022.

(Continued)

*Primary Examiner* — Jack Chiang
*Assistant Examiner* — Aric Lin
(74) *Attorney, Agent, or Firm* — Amin, Turocy & Watson, LLP

(57) ABSTRACT

A quantum noise mitigation system can comprise a memory that stores, and a processor that executes, computer executable components comprising a pulse calibration component that, for controlling execution of a quantum gate of a quantum circuit, calibrates an echo extender tone parameter for a set of echo extender tones of an echo pulse sequence, wherein the pulse calibration component inserts the set of echo extender tones into the echo pulse sequence of an initial pulse sequence resulting in generation of a modified pulse sequence for use in controlling the execution of the quantum gate, and a parameterizing component that parameterizes the set of echo extender tones using a scalable stretch factor for stretching respective durations of the set of echo extender tones.

20 Claims, 15 Drawing Sheets

(56) References Cited

OTHER PUBLICATIONS

Ibrahim, "Architecture-Centric Quantum Computing Algorithms and Software/Hardware Co-Designs," A dissertation submitted to the Graduate Faculty of North Carolina State University, Raleigh, North Carolina, Oct. 28, 2022, https://www.lib.ncsu.edu/resolver/1840.20/40220.
Earnest, et al., "Pulse-efficient circuit transpilation for quantum applications on cross-resonance-based hardware," Physical Review Research 3, 043088, published Oct. 29, 2021, DOI: 10.1103/PhysRevResearch.3.043088.
Kim, et al., "Scalable error mitigation for noisy quantum circuits produces competitive expectation values," arXiv:2108.09197v1 [quant-ph] Aug. 20, 2021.
Carrera-Vazquez, et al., "Well-conditioned multi-product formulas for hardware-friendly Hamiltonian simulation," arXiv:2207.11268v1 [quant-ph] Jul. 22, 2022.
Moskalenko, et al., "High fidelity two-qubit gates on fluxoniums using a tunable coupler," npj Quantum Information vol. 8, Article No. 130, Published: Nov. 8, 2022.

900

920

B

1200

1232 DIRECTING, BY THE SYSTEM, A SECOND ITERATION OF EXECUTION OF THE QUANTUM CIRCUIT EMPLOYING THE MODIFIED PULSE SEQUENCE AND A SECOND STRETCH FACTOR AS THE SCALABLE STRETCH FACTOR FOR EACH ECHO EXTENDER TONE OF THE PAIR OF ECHO EXTENDER TONES.

1234 APPLYING, BY THE CORRESPONDING QUANTUM SYSTEM, THE PAIR OF ECHO EXTENDER TONES EACH HAVING A SECOND DURATION, WHEREIN THE SECOND DURATION IS DIFFERENT THAN THE FIRST DURATION.

1236 DIRECTING, BY THE SYSTEM, THE FIRST ITERATION AND THE SECOND ITERATION ABSENT ADDITIONAL CALIBRATION OF THE RESPECTIVE ECHO EXTENDER TONES OF THE RESPECTIVE MODIFIED PULSE SEQUENCES EMPLOYED FOR THE FIRST ITERATION AND THE SECOND ITERATION.

1238 OBTAINING, BY THE SYSTEM, MEASUREMENT READOUT DATA COMPRISING RESPECTIVE NOISE MITIGATED OUTCOMES FOR THE FIRST ITERATION AND THE SECOND ITERATION.

1240 ESTIMATING, BY THE SYSTEM, A FINAL NOISE MITIGATED OUTCOME BASED ON INTERPOLATION OF THE NOISE MITIGATED OUTCOMES FOR THE FIRST ITERATION AND THE SECOND ITERATION.

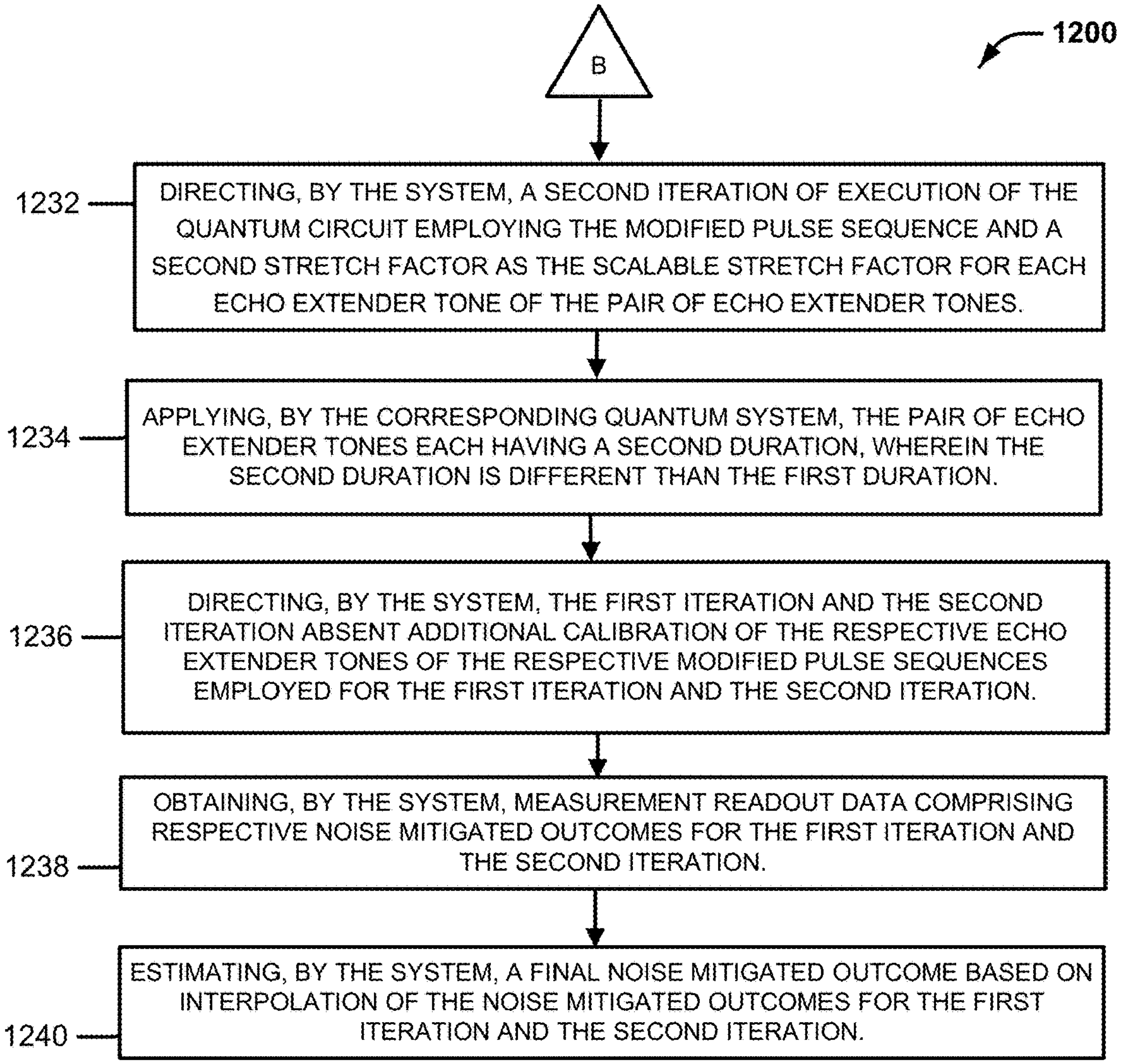

FIG. 14

COMPUTER 1501

PROCESSOR SET 1510

PROCESSING CIRCUITRY 1520

CACHE 1521

COMMUNICATION FABRIC 1511

VOLATILE MEMORY 1512

PERSISTENT STORAGE 1513

OPERATING SYSTEM 1522

NOISE EXTRAPOLATION CODE

1580

PERIPHERAL DEVICE SET 1514

UI DEVICE SET 1523

STORAGE 1524

IoT SENSOR SET 1525

NETWORK MODULE 1515

END USER DEVICE 1503

REMOTE SERVER 1504

REMOTE DATABASE 1530

WAN 1502

PRIVATE CLOUD 1506

GATEWAY 1540

PUBLIC CLOUD 1505

CLOUD ORCHESTRATION MODULE 1541

HOST PHYSICAL MACHINE SET 1542

VIRTUAL MACHINE SET 1543

CONTAINER SET 1544

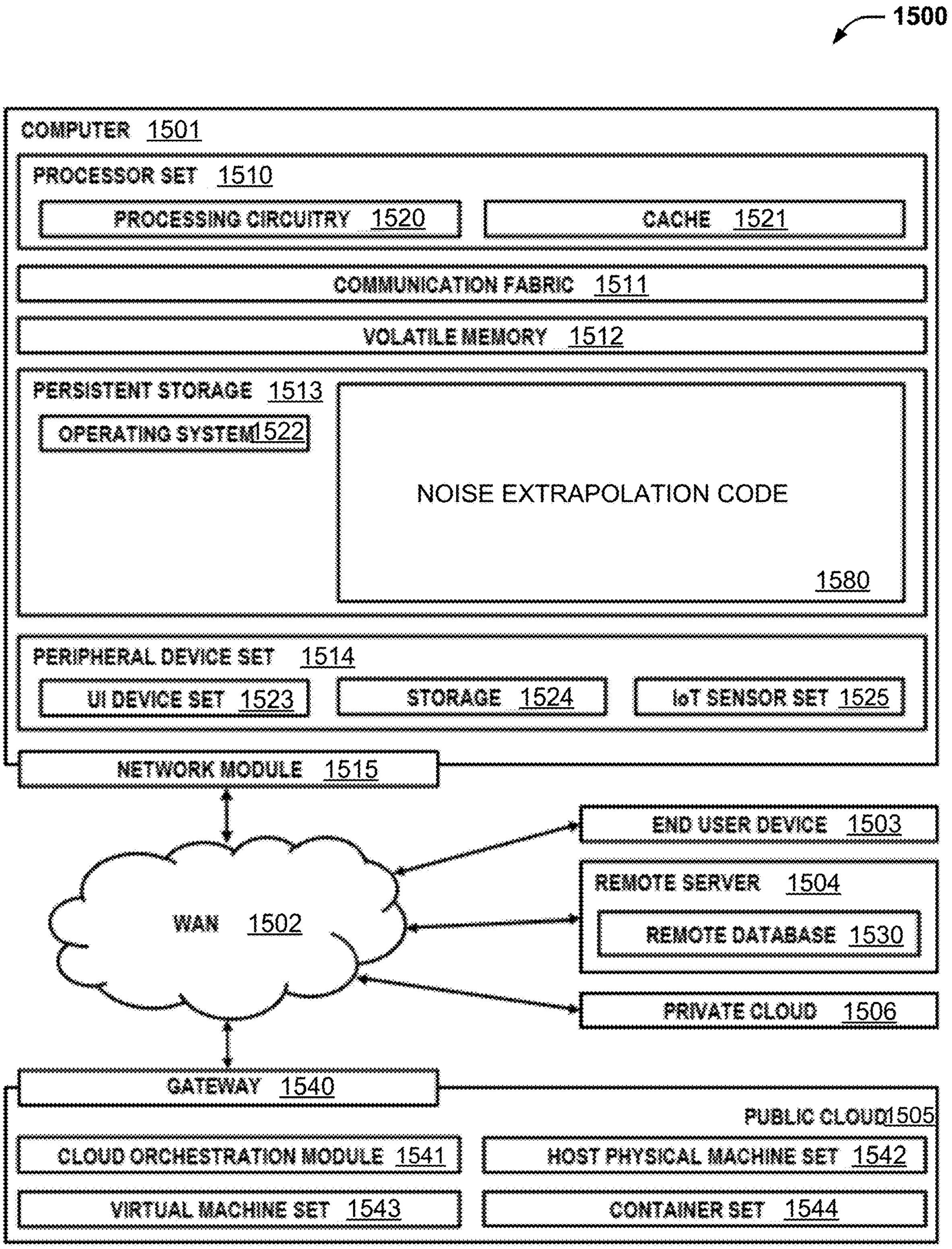

FIG. 15

SCALABLE ANALOG ZERO NOISE EXTRAPOLATION BY ECHO EXTENSION

TECHNICAL FIELD

The present disclosure relates to quantum circuits, and more particularly to the mitigation of noise produced during the execution of a quantum circuit on qubits of a quantum device.

BACKGROUND

In quantum computing systems and/or in classical computing systems, quantum circuit depth and/or width, type of quantum gates employed and/or total number of quantum gates employed, can attribute to increased system noise and thus can lead to estimation error in resulting measurements. Mitigation of that noise can be performed to limit the estimation error resulting therefrom.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or non-transitory computer-readable mediums are described that can facilitate noise mitigation of a quantum circuit by generation and use of pulse sequences, where the generation and use have reduced overhead as compared to existing techniques for noise mitigation.

According to an embodiment, a system can comprise a memory that stores computer executable components, and a processor that executes the computer executable components stored in the memory. The computer executable components comprise a pulse calibration component that, for controlling execution of a quantum gate of a quantum circuit, calibrates an echo extender tone parameter for a set of echo extender tones of an echo pulse sequence, wherein the pulse calibration component inserts the set of echo extender tones into the echo pulse sequence of an initial pulse sequence resulting in generation of a modified pulse sequence for use in controlling the execution of the quantum gate, and a parameterizing component that parameterizes the set of echo extender tones using a scalable stretch factor for stretching respective durations of the set of echo extender tones.

According to another embodiment, a computer-implemented method for noise mitigation of a quantum circuit comprises, for controlling execution of a quantum gate of a quantum circuit, calibrating, by a system operatively coupled to at least one processor, an echo extender tone parameter for a set of echo extender tones of an echo pulse sequence, inserting, by the system, the set of echo extender tones into the echo pulse sequence of an initial pulse sequence resulting in generation of a modified pulse sequence for use in controlling the execution of the quantum gate, and parameterizing, by the system, the set of echo extender tones using a scalable stretch factor for stretching respective durations of the set of echo extender tones.

According to another embodiment, a computer program product facilitating a process for noise mitigation of a quantum circuit comprises a computer readable storage medium having program instructions embodied therewith, the program instructions executable by a processor to cause the processor to for controlling execution of a quantum gate of a quantum circuit, calibrate, by the processor, an echo extender tone parameter for a set of echo extender tones of an echo pulse sequence, wherein the calibrating is based on operation of a plurality of iterations of an echo extender tone, of the set of echo extender tones, using a plurality of varying durations of the echo extender tone, insert, by the processor, the set of echo extender tones into the echo pulse sequence of an initial pulse sequence resulting in generation of a modified pulse sequence for use in controlling the execution of the quantum gate, and parameterize, by the processor, the set of echo extender tones using a scalable stretch factor for stretching respective durations of the set of echo extender tones.

An advantage of such system, computer-implemented method and/or computer program product can be a reduced calibration overhead for calibration of a pulse sequence for use in executing varying iterations of the quantum circuit as compared to existing pulse sequence calibration frameworks. As a result, a same cross-resonance (CR) noise can be reliably amplified for each of the varying iterations without additional echo extender tone calibration when varying stretch factors are applied at the scalable stretch factor for different ones of the varying iterations. As still another result, the reduced calibration overhead can result in reduced overall quantum circuit calibration and execution time and thus increased usable coherency time of qubits of a quantum device being operated upon.

Moreover, use of the system, computer-implemented method and/or computer program product can result in determination of a more precise estimate of a zero-noise limit of the quantum circuit, further resulting in reduced negative effect of operation of the noise-mitigated quantum circuit on the qubits of the quantum device being operated upon. The reduced negative effects can comprise reduced impact of qubit decoherence and/or qubit energy relaxation of the one or more qubits of the quantum device being operated upon.

DESCRIPTION OF THE DRAWINGS

FIG. 6 also illustrates a second graph showing the modified pulse sequence, in accordance with one or more embodiments described herein.

FIG. 9 also illustrates a second graph showing a fine calibration based on the rough calibration, in accordance with one or more embodiments described herein.

FIG. 14 illustrates a continuation of the flow diagram of FIGS. 12 and 13, of an example, non-limiting computer-implemented method that can facilitate noise mitigation of a quantum circuit, in accordance with one or more embodiments described herein.

FIG. 15 illustrates a block diagram of example, non-limiting, computer environment in accordance with one or more embodiments described herein.

DETAILED DESCRIPTION

Figure 1:
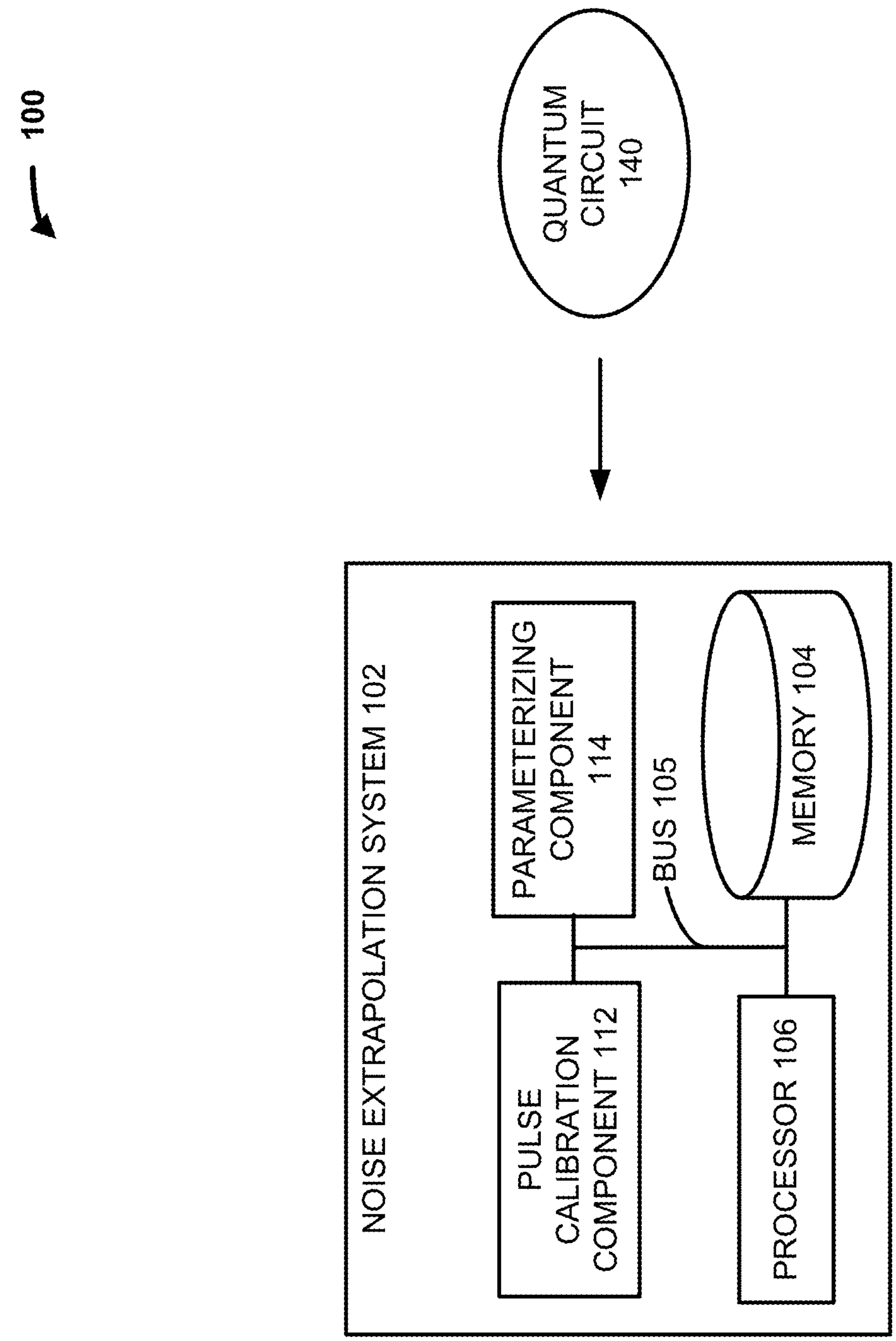
FIG. 1 illustrates a block diagram of an example, non-limiting system that can facilitate noise mitigation of a quantum circuit, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

Qubit states can only exist (or can only be coherent) for a limited amount of time. Thus, an objective of operation of a quantum logic circuit (e.g., a quantum processor including one or more qubits) can be to maximize the utilization of the coherence time of the employed qubits. Time spent operating the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit on a quantum system can be supported, such as by a pulse component (also herein referred to as a waveform generator), to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Such quantum noise also can cause undesired energy relations of an energy state of a qubit, further affecting measurement of an altered state.

Quantum noise can refer to noise attributable to the discrete and/or probabilistic natures of quantum interactions. Noise in two-qubit gates can be a limiting source of error in existing quantum computers.

That is, in actual hardware, most quantum gates are implemented imperfectly. Mathematically, an imperfect quantum gate can always be decomposed as a perfect gate followed by a quantum channel describing all the imperfections, which we collectively refer to as noise. The noise on single-qubit gates is typically much weaker than that on two-qubit gates, so it can be typical to approximate single-qubit gates as being noiseless. That is, introduction of noise is most-always inherent when operating a two-qubit gate.

Such noise can be attempted to be lowered by a noise mitigation framework. Existing noise mitigation frameworks, such as probabilistic error cancellation, can be used but have drawbacks that can include undesirable large overhead for preparation of quantum circuits using the frameworks, thus limiting available coherence time of qubits and taking an exponentially scaling number of shots, and thus exponentially scaling amount of run time.

Another existing framework is zero noise extrapolation (ZNE). ZNE can allow for obtaining noiseless expectation values of observables. A ZNE protocol generally comprises a circuit stretch step that amplifies the noise (e.g., time invariant noise) in a quantum circuit. By running multiple (e.g., varying) iterations (e.g., shots) of the quantum circuit with different levels of noise, the measured noisy observables can be extrapolated to a zero-noise limit. Methods to implement ZNE include digital ZNE and analog ZNE.

Digital ZNE involves repeating a given quantum gate, such as the noisiest in a quantum circuit, multiple times C (e.g., stretch factor C) to amplify the noise. For instance, a quantum circuit in which all controlled-NOT (CNOT) gates are replaced by three CNOT gates is still logically the same but has a higher noise when the CNOT is not ideal. Although this operation can be implemented as a quantum circuit compilation without extra calibration overhead, the stretch factors C can be limited and discretized because $C \in \mathbb{N}$, where $\mathbb{N}$ is a set of natural numbers. This can be problematic for quantum circuits that, without noise amplification, are already operating close to the noise limits of a respective quantum device on which the quantum circuits are being executed.

Analog zero noise extrapolation generally stretches control pulses implementing quantum gates to increase noise strength of the implementation. Several copies of logically equivalent quantum circuits with different stretch factors are executed so that the expectation value of an observable can be extrapolated to the zero-noise limit. A stretch factor C refers herein to a multiplicative factor that scales the duration of a pulse and/or pulse schedule.

More particularly, analog ZNE can allow $C \in \mathfrak{R}$ by re-calibrating the basis gate set for every C, where $\mathfrak{R}$ is a set of positive real numbers. Basis gates refer herein to a set of quantum gates available in a target quantum device that can generally guarantee the universality of a quantum computation. The basis gate set typically can be {RZ, SX, CX} in superconducting qubits with fixed qubit frequency. RZ is a single-qubit gate that rotates the respective qubit state of a qubit around the Z-axis of the qubit. SX is the square-root of X gate that rotates the respective qubit state by $\pi/2$ around the X-axis of the qubit. CX is a controlled X gate (e.g., a CNOT gate).

The re-calibrating of an analog ZNE method can allow a more precise estimate of the zero-noise limit and implies that deep circuits that operate close to the maximum depth imposed by the noise can be run. However, maintaining several copies of the basis gate undesirably requires the device to run time-consuming calibration tasks. That is, analog ZNE employs calibration of many quantum gates for varying iterations (e.g., shots) of a quantum circuit to be executed. This can comprise a large overhead that undesirably increases run time. A calibration is only valid for a limited amount of time due to drifts (e.g., temperature fluctuations of the control electronics and/or fluctuations in qubit properties) in the quantum system being employed. Therefore, lengthy calibration times can be undesirable because they can use up time during which the qubits are available. If calibration takes too long, calibration might not be valid by the time the calibration is used in an execution of a quantum circuit on the respective quantum device.

Figure 5:
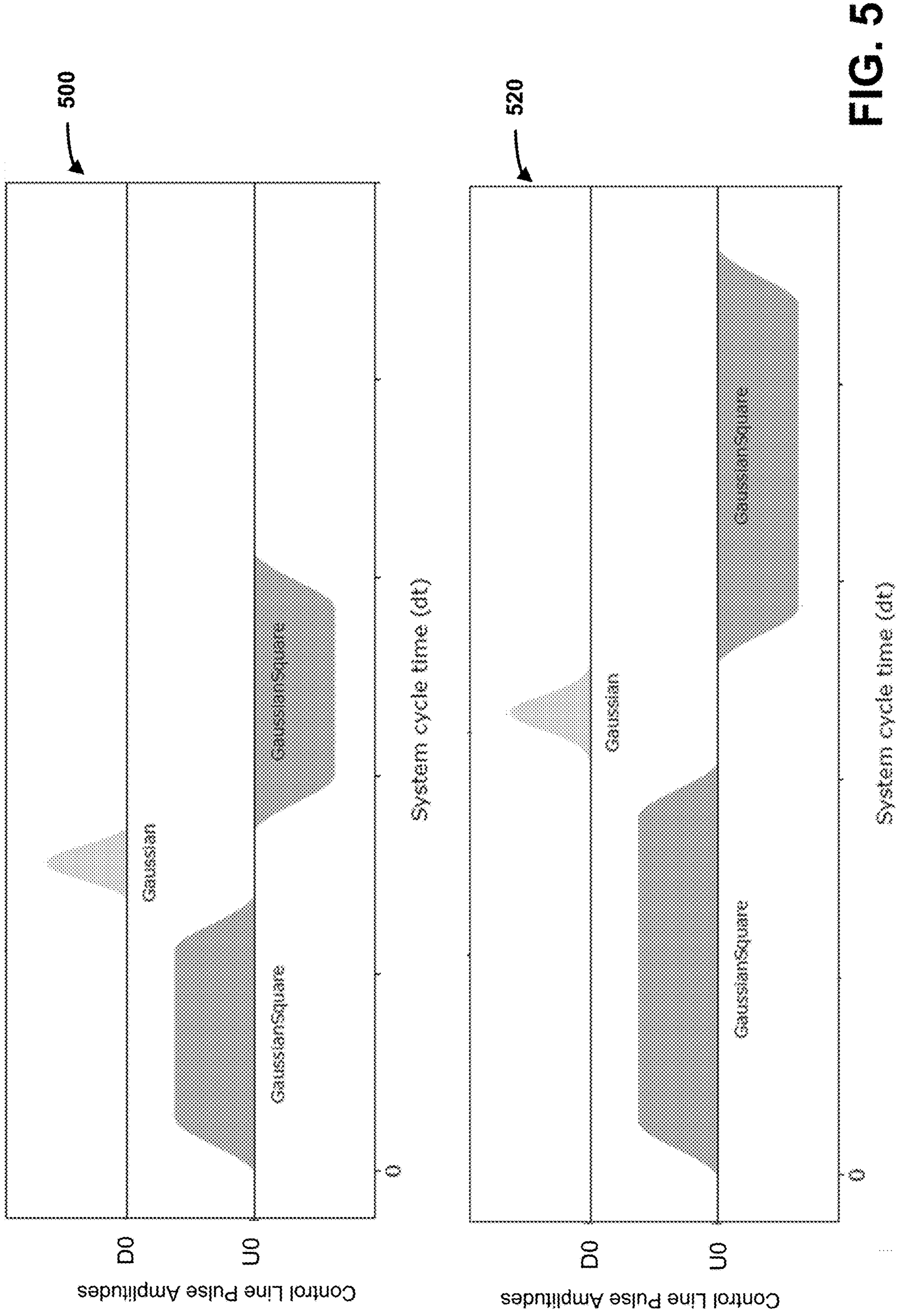
FIG. 5 illustrates a graph of a pulse sequence absent modification by the noise extrapolation system of FIG. 3, in accordance with one or more embodiments described herein.

For example, as illustrated at FIG. 5, the pulse graphs 500 and 520 illustrate an existing method of analog ZNE for noise mitigation for a quantum gate executed using an exemplary echoed-cross-resonance (ECR) pulse sequence for an echo pulse sequence. It is noted that pulse graphs 500 and 520 each illustrate system cycle time in units of delta-time (dt) graphed against various respective pulse amplitudes for a control qubit (D0) driven at the frequency of a target qubit U0 (e.g., the pulse applied to the control qubit at the frequency of the target qubit, to drive one qubit at the frequency of the other) shown at corresponding control lines of the pulse graph 500.

The existing analog ZNE method illustrated employs stretching all the pulses (e.g., the driving pulses at the control line U0 and the control qubit pulse at control line D0) by a stretch factor C. The pulse graph 520 has pulses that are longer than the pulses of the pulse graph 500 to illustrate implementation of a stretch factor (e.g., pulses of the pulse graph 500 employ a stretch factor of C=1.0 while pulses of the pulse graph 520 employ a stretch factor of C=1.5). Furthermore, because the existing analog ZNE framework stretches the cross-resonance (CR) pulses themselves, the CR pulse amplitude must be adjusted for different stretch factors. However, this can cause different Stark shifts on the control qubit frequency, which can cause the qubit to experience different relaxation at different corresponding amplitudes. Accordingly, in the existing analog ZNE method each different iteration of the illustrated echo pulse sequence performed, and thus for each different stretch factor of the illustrated echo pulse sequence, the time-consuming calibration tasks are undesirably re-run to calibrate the amplitude and phase of the pulses.

To address one or more of the aforementioned deficiencies of existing noise mitigation frameworks, one or more frameworks discussed herein can be employed to mitigate noise for a quantum circuit by using reduced overhead as compared to the existing noise mitigation techniques. The reduced overhead can result in reduced overall quantum circuit calibration and execution time and thus increased accuracy of the results as well as increased availability of the quantum device (e.g., for operation of additional jobs).

Moreover, the one or more frameworks described herein can result in determination of a more precise estimate of a zero-noise limit of the quantum circuit, further resulting in reduced negative effect of operation of the noise-mitigated quantum circuit on the qubits of the quantum device being operated upon. The reduced negative effects can comprise reduced impact of qubit decoherence and/or qubit energy relaxation of the one or more qubits of the quantum device being operated upon.

One or more of these advantages can be due to employing echo techniques, such as cross resonance (ECR) techniques, including extended control pulse sequences that are stretched based on a set of varying stretch factors (based on a scalable stretch factor). Duration of the control pulses can thus be varied, but without scaling amplitude of the control pulses. In this way, full recalibration of all pulse parameters, such as based on the different ones of the varying stretch factors, can be omitted, while still preserving a logical function of the respective CR gate. That is, the one or more frameworks described herein can remove the overhead of maintaining multiple copies of a basis gate set at different stretch factors and performing separate calibration for each one.

Generally, the one or more frameworks discussed herein can comprise, for controlling execution of a quantum gate of a quantum circuit (e.g., to be employed for control pulsing), calibrating an echo extender tone parameter for a set of echo extender tones (e.g., pulses) of an echo pulse sequence. An echo pulse sequence, as used herein, can comprise an echo structure, such as an echo-cross resonance (ECR) structure or other higher order echo structure. The echo pulse sequence can be stretchable because it can be a function of a stretch factor C, which stretch factor C can be replaced by varying stretch factors $C_1$, $C_2$, . . . $C_N$ for different iterations (e.g., shots) of the echo pulse sequence. This can result in varying stretchings of varying durations of pulses of the iterations of the echo pulse sequence.

The echo pulse sequence can be generated using a three-tiered calibration process for calibrating an echo extender tone for use with the echo pulse sequence of an initial pulse sequence. Generally, the intent of the calibration process can be to determine an optimum amplitude for each extender echo tone of a set of extender echo tones to be inserted into the echo pulse sequence to minimize (e.g., cancel out) unwanted rotation caused by the stretching of the varying durations of pulses (also referred to herein as tones) of the iterations of the pulse sequence.

A first tier can comprise a rough calibration operating a set of varying durations of the echo extender tone to determine a target echo extender tone parameter, such as amplitude, for the varying durations of the echo extender tone. A second tier can comprise a fine calibration, executed at a higher granulation than a granulation of the rough calibration. An exemplary fine calibration can comprise using a set of two different initial quantum states to determine an optimal parameter value at an intersection of measurements of the two different initial quantum states. Based on an echo extender tone parameter, such as an echo extender tone amplitude, determined from the fine calibration, a third tier can comprise determining whether rotation of a target qubit to which the resulting echo extender tone (with the resulting echo extender tone parameter) is applied satisfies a threshold for minimization of the rotation. Where the threshold is satisfied, the echo extender tone parameter can be employed for a set of echo extender tones inserted into the echo pulse sequence, and particularly for a pair of echo extender tones of that set of echo extender tones. Where the threshold is not satisfied, additional fine calibration of the echo extender tone parameter can be performed.

The echo extender tones, of the set of echo extender tones, can be parameterized with a placeholder stretch factor C to be replaced during a mapping of the resulting pulse sequence. That is, at least a pair of the echo extender tones, of the set of echo extender tones, each can employ a same target amplitude resulting from the three-tiered calibration process. And, based on different stretch factors C of a set of stretch factors $C_1$, $C_2$, . . . $C_N$ replacing the placeholder stretch factor C, duration of the each echo extender tone can be varied (e.g., equally) without varying the respective target amplitudes of the echo extender tones. Accordingly, separate calibrations relative to each different stretch factor C of the set of stretch factors $C_1$, $C_2$, . . . $C_N$ employed can be omitted.

It is further noted that different from the existing analog ZNE technique discussed above, the respective echo extender tones are stretched (e.g., according to the corresponding stretch factor C). However, the positive and negative tones of the respective echo pulse sequence, and the gate at the drive line D0 of the respective echo pulse sequence, are not stretched.

In addition to the above-noted three-tier process, a standard CNOT gate can be generated from a cross-resonance (CR) interaction and then calibrated. The amplitude of the pulse driving the CR interaction, determined from the calibration, can be employed as an amplitude of a positive tone of the echo pulse sequence output from the aforementioned echo extender parameter calibration. Likewise, the amplitude can be employed as an amplitude of a negative tone and of a different pair of echo extender tones of the et of echo extender tones, all output from the aforementioned echo extender parameter calibration.

Subsequently, employing the echo pulse sequence, a quantum circuit, and one or more defined stretch factors C, a pulse schedule of pulse sequences to apply for executing varying iterations (e.g., shots) of the quantum circuit can be generated. This generation can comprise, for a pulse sequence, translating a quantum gate into a sequence of stretchable basis gates, replacing the basis gates with modified basis gates as functions of the stretch factor C. and mapping the modified basis gates to the resulting pulse sequence. This mapping can comprise replacing the placeholder stretch factor C for the echo extender tones of the respective echo pulse sequences with one of a set of stretch factors $C_1$, $C_2$, . . . $C_N$ scaled based off of the one or more defined stretch factors C. The compiling thus results in compilation of a stretched pulse schedule S(C) comprising a set of the stretched pulse sequences.

Thereafter, a number of iterations of the quantum circuit can be executed employing the stretched pulse schedule S(C) as control pulses, and thus employing the different ones of the stretch factors $C_1$, $C_2$, . . . $C_N$. Quantum measurement readout can be performed, for each iteration, resulting in a set of outcomes $O_1$, $O_2$, . . . $O_N$. By a method of analysis, such as interpolation, of the outcomes $O_1$, $O_2$, . . . $O_N$, a noise-free outcome $\tilde{O}$ can be estimated for performance of the target quantum gate.

As used herein, a quantum circuit can be a set of operations, such as quantum gates, performed on a classical system and/or on a quantum system.

A quantum system can have a set of real-world physical qubits with the purpose of obtaining one or more qubit measurements.

A quantum processor can comprise the one or more real-world physical qubits.

As used herein, the term "cost" can refer to money, power, memory, bandwidth, time and/or labor.

As used herein, the terms "entity," "requesting entity," and "user entity" can refer to a machine, device, component, hardware, software, smart device and/or human.

As used herein, the term "generate" can refer to generation, writing and/or rewriting of data (and/or meta-data) that represents the aspect (e.g., pulse, tone, gate, etc.) being generated.

As used herein, the term "satisfied" can refer to whether a threshold is met and/or exceeded.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200 and/or 300 illustrated at FIGS. 1, 2 and/or 3, and/or systems thereof, can further comprise one or more computer and/or computing-based elements described herein with reference to an operating environment, such as the operating environment 1400 illustrated at FIG. 14. In one or more described embodiments, computer and/or computing-based elements can be used in connection with implementing one or more of the systems, devices, components and/or computer-implemented operations shown and/or described in connection with FIGS. 1, 2 and/or 3 and/or with other figures described herein.

Turning now in particular to one or more figures, and first to FIG. 1, the figure illustrates a block diagram of an example, non-limiting system 100 that can facilitate quantum gate noise mitigation (e.g., noise extrapolation), of one or more quantum gates (e.g., of one or more quantum circuits) at least partially in parallel with one another, in accordance with one or more embodiments described herein.

The non-limiting system 100 can comprise a noise extrapolation system 102, which can be associated with a cloud computing environment. The noise extrapolation system 102 can comprise one or more components, such as a memory 104, processor 106, bus 105, pulse calibration component 112 and/or parameterizing component 114.

Generally, noise extrapolation system 102, and thus non-limiting system 100, can facilitate identification of one or more quantum gates of a quantum circuit 140 for which a pulse sequence having an echo structure can be applied to control execution of a quantum gate, of the one or more gates, while mitigating noise caused by execution of the quantum gate. As used herein, this minimization can comprise approaching and/or satisfying a noise-free execution (e.g., a noise-free outcome $\tilde{O}$ for execution of the quantum gate and/or quantum circuit can be estimated).

It is noted that non-limiting system 100 is only generally explained to provide a base explanation for further, and more detailed, description below relative to at least the non-limiting system 200 of FIG. 2 and non-limiting system 300 of FIG. 3.

Generally, the pulse calibration component 112 can, for controlling execution of a quantum gate of a quantum circuit, calibrate an echo extender tone parameter for a set of echo extender tones of an echo pulse sequence. The intent can be to insert the echo pulse sequence into an initial pulse sequence to be used for execution of the quantum gate while mitigating noise caused by execution of the quantum gate. More particularly, the intent can be to insert the set of echo extender tones into the echo pulse sequence, with each echo extender tone of a pair of echo extender tones (of the set of echo extender tones) having the same calibrated echo extender tone parameter, such as an echo extender tone amplitude.

The calibrating can be generally based on operation of a plurality of iterations of an echo extender tone using a plurality of varying durations of the echo extender tone. That is, the pulse calibration component 112 can employ a quantum system to obtain quantum measurements, which the pulse calibration component 112 can subsequently analyze at the classical noise extrapolation system 102. Once the echo extender tone parameter is identified, the pulse calibration component 112, at the classical noise extrapolation system 102, can insert the set of echo extender tones, having the echo extender tone parameter, into the echo pulse sequence of the initial pulse sequence, thus resulting in generation of a modified pulse sequence for use in controlling the execution of the quantum gate of the quantum circuit 140.

Further, the parameterizing component 114, at the noise extrapolation system 102, can parameterize the set of echo extender tones using a scalable stretch factor (e.g., referred to as C) for stretching respective durations of the set of echo extender tones.

As will be explained below, varying stretch factor quantities can be employed as the scalable stretch factor, such as for respective varying iterations of the modified pulse sequence, without additional calibration being performed by the pulse calibration component relative to each different stretch factor quantity employed. This can be at least partially due to use of echo extender tones, for each of the varying iterations of the modified pulse sequence, having a same calibrated echo extender tone parameter (e.g., amplitude), and instead varying the duration (e.g., stretching) the respective pairs of echo extender tones based on the varying stretch factors employed (e.g., having the varying stretch factor quantities).

Figure 2:
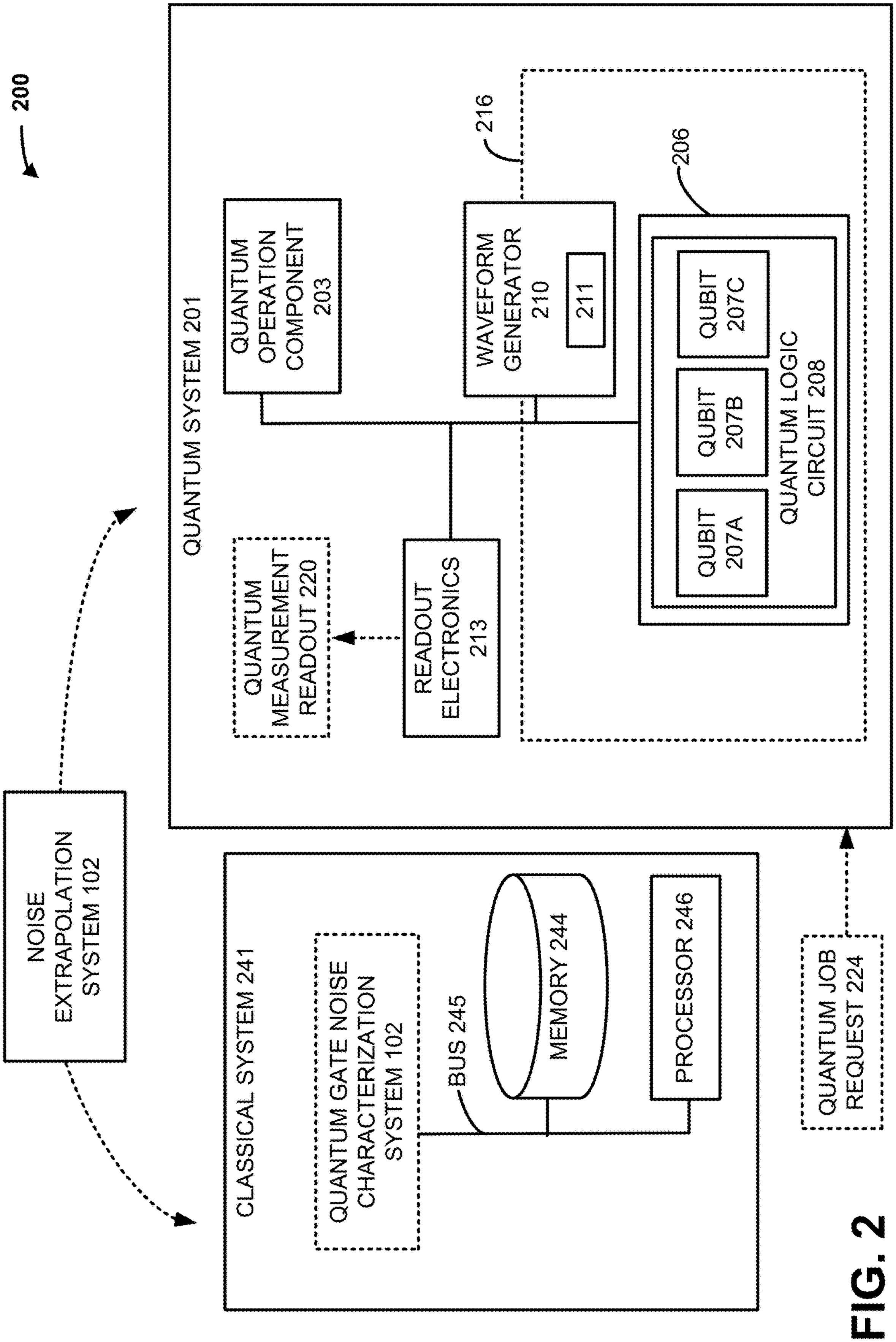
FIG. 2 illustrates a diagram of another example, non-limiting system that can facilitate noise mitigation of a quantum circuit, in accordance with the one or more embodiments described herein.

Turning next to FIG. 2, a non-limiting system 200 is illustrated that can comprise the noise extrapolation system 102 of FIG. 1. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a classical system 241 that can be employed with or without a quantum system, such as the quantum system 201. The classical system 241, can comprise components, such as a memory 244, processor 246 and/or bus 245. The noise extrapolation system 102 can be at least partially comprised by and/or be external to the classical system 241. In one or more embodiments, the memory 244 and/or processor 246 can be omitted, and instead the memory 104 and/or processor 106 can be employed. In one or more embodiments, the noise extrapolation system 102 can employ the memory 244 and/or processor 246 and the memory 104 and/or processor 106 can be omitted.

In one or more embodiments, the noise extrapolation system 102 can be at least partially comprised by and/or be external to the quantum system 201.

In one or more embodiments, the non-limiting system 200 can be a hybrid system and thus can include both a quantum system and a classical system, such as the quantum system 201 and the classical-based system 241 (also herein referred to as a classical system 241). In one or more embodiments, one or more components of the quantum system 201, such as the readout electronics 213, can be at least partially comprised by the classical system 241, or otherwise comprised external to the quantum system 201. In one or more embodiments, one or more components of the classical system 241 can be at least partially comprised by the quantum system 201, or otherwise comprised external to the classical system 241.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The classical system 202 and/or the quantum system 201 can be associated with, such as accessible via, a cloud computing environment such that aspects of classical processing can be distributed between the classical system 241 and the cloud computing environment.

Turning now to the quantum system 201, generally based on a quantum job request 224, such as comprising a quantum circuit to be executed (e.g., resulting from use of the noise extrapolation system 102), the quantum operation component 203 and/or quantum processor 206 can direct execution of the quantum circuit to be executed at the quantum logic circuit 208. For example, the quantum circuit to be executed can comprise one or more quantum gates for which noise mitigation by use of an echo pulse control sequence can be employed.

Generally, the quantum system 201 (e.g., quantum computer system and/or superconducting quantum computer system) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 220, can be responsive to the quantum job request 224 and associated input data and can be based at least in part on the input data, quantum functions and/or quantum computations.

In one or more embodiments, the quantum system 201 can comprise components, such as a quantum operation component 203, a quantum processor 206, pulse component 210 (e.g., a waveform generator) and/or the readout electronics 213. In one or more other embodiments, the readout electronics 213 can be comprised at least partially by the classical system 241 and/or be external to the quantum system 201. The quantum processor 206 can comprise the quantum logic circuit 208 comprising one or more, such as plural, qubits 207. Individual qubits 207A, 207B and 207C, for example, can be fixed frequency and/or single junction qubits, such as transmon qubits.

The quantum processor 206 can be any suitable processor. The quantum processor 206 can generate one or more instructions for controlling the one or more processes of the quantum operation component 203 and/or for controlling the quantum logic circuit 208.

The quantum operation component 203 can, at the quantum system 201, obtain (e.g., download, receive and/or search for) a quantum job request 224 requesting execution of one or more quantum programs and/or a physical qubit layout using one or more control pulse sequences. The quantum job request 224 can be provided in any suitable format, such as a text format, binary format and/or another suitable format. In one or more embodiments, the quantum job request 224 can be issued by the classical system 241 and/or the noise extrapolation system 102 to the quantum system 201.

The quantum operation component 203 can determine one or more quantum logic circuits, such as based on use of the noise extrapolation system 102, for executing a quantum program. In one or more embodiments, the quantum operation component 203 and/or quantum processor 206 can direct the waveform generator 210 (e.g., pulse generator to generate one or more pulses 211, tones and/or waveforms to affect one or more qubits 207 based on the aforementioned control pulse sequence. It is noted that the quantum system 201, such as the quantum operation component 203, can perform one or more modifications to a control pulse sequence obtained by the quantum system 201, such as received as part of a quantum job request 224.

The waveform generator 210 can generally perform one or more quantum processes, calculations and/or measurements for shifting the frequency of one or more qubits 207, such as when in respective excited states. For example, the waveform generator 210 can operate one or more qubit effectors, such as qubit oscillators, harmonic oscillators and/or pulse generators to cause one or more pulses to stimulate and/or manipulate the state of the one or more qubits 207 comprised by the quantum system 201.

The quantum logic circuit 208 and a portion or all of the waveform generator 210 can be contained in a cryogenic environment, such as generated by a cryogenic chamber 216, such as comprising a dilution refrigerator. Indeed, a signal can be generated by the waveform generator 210 to affect one or more of the plurality of qubits 207. Where the plurality of qubits 207 are superconducting qubits, cryogenic temperatures, such as about 4 Kelvin (K) or lower can be employed for function of these physical qubits. Accordingly, one or more elements of the readout electronics 213 also can be constructed to perform at such cryogenic temperatures. That is, the readout electronics 213, or at least a portion thereof, can be contained in the cryogenic chamber 216.

The readout electronics 213 can be employed to read a state, frequency and/or other characteristic of qubit, excited, decaying or otherwise of the plurality of qubits 207 of the quantum logic circuit 208.

Turning now to further description of the classical system 241, generally, the classical system 241 can comprise any suitable type of component, machine, device, facility, apparatus and/or instrument that comprises a processor and/or can be capable of effective and/or operative communication with a wired and/or wireless network. All such embodiments are envisioned. For example, the classical 241 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the classical system 241 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In one or more embodiments, the classical system 241 can comprise the processor 246 (e.g., computer processing unit, microprocessor, classical processor, quantum processor and/or like processor). In one or more embodiments, a component associated with qubit reset system 241, as described herein with or without reference to the one or more figures of the one or more embodiments, can comprise one or more computer and/or machine readable, writable and/or executable components and/or instructions that can be executed by processor 246 to provide performance of one or more processes defined by such one or more components and/or instructions.

In one or more embodiments, the computer-readable memory 244 can be operably connected to the processor 246. The memory 244 can store computer-executable instructions that, upon execution by the processor 246, can cause the processor 246 to perform one or more actions.

Figure 3:
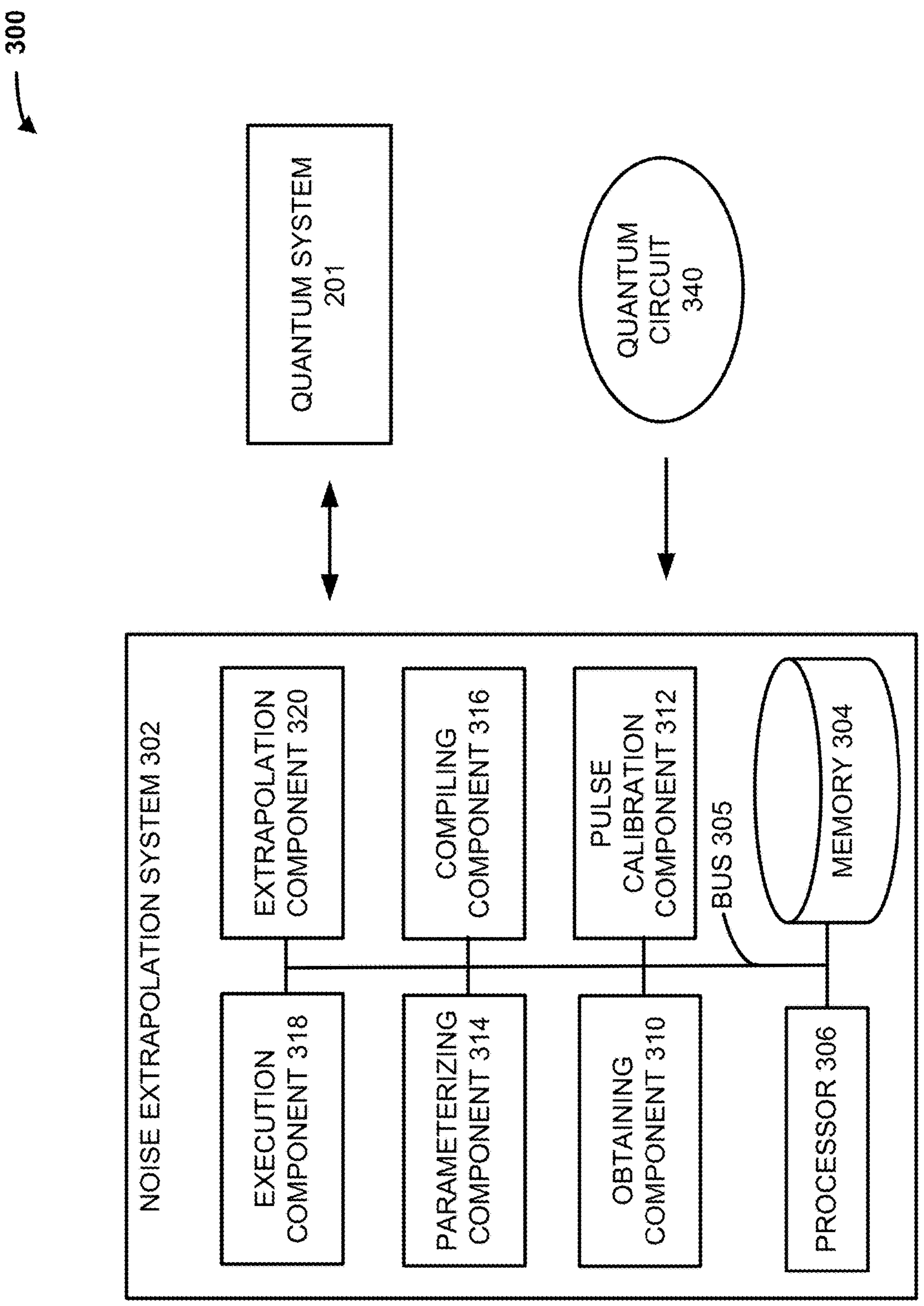
FIG. 3 illustrates a diagram of yet another example, non-limiting system that can facilitate noise mitigation of a quantum circuit, in accordance with one or more embodiments described herein.

Turning now to FIG. 3, illustrated is a non-limiting system 300 comprising another embodiment of a noise extrapolation system 302. Repetitive description of like elements and/or processes employed in respective embodiments is omitted for sake of brevity. As indicated previously, description relative to an embodiment of FIG. 1 or 2 can be applicable to an embodiment of FIG. 3. Likewise, description relative to an embodiment of FIG. 3 can be applicable to an embodiment of FIG. 1 or 2.

One or more communications between one or more components of the non-limiting system 300 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The noise extrapolation system 302 can be associated with, such as accessible via, a cloud computing environment.

The noise extrapolation system 302 can function in cooperation with the quantum system 201 in the same manner as the noise extrapolation system 102 has been explained to function in cooperation with the quantum system 201. Accordingly, repeat description is not provided for sake of brevity.

The noise extrapolation system 302 can comprise a plurality of components. The components can include a memory 304, processor 306, bus 305, obtaining component 310, pulse calibration component 312, parameterizing component 314, compiling component 316, execution component 318 and/or extrapolation component 320.

Generally, noise extrapolation system 302, and thus non-limiting system 300, can facilitate identification of one or more quantum gates of a quantum circuit 340 for which a pulse sequence having an echo structure can be applied to control execution of a quantum gate, of the one or more gates, while mitigating noise caused by execution of the quantum gate. As used herein, this minimization can comprise approaching and/or satisfying a noise-free execution (e.g., a noise-free outcome Õ for execution of the quantum gate and/or quantum circuit can be estimated).

Figure 4:
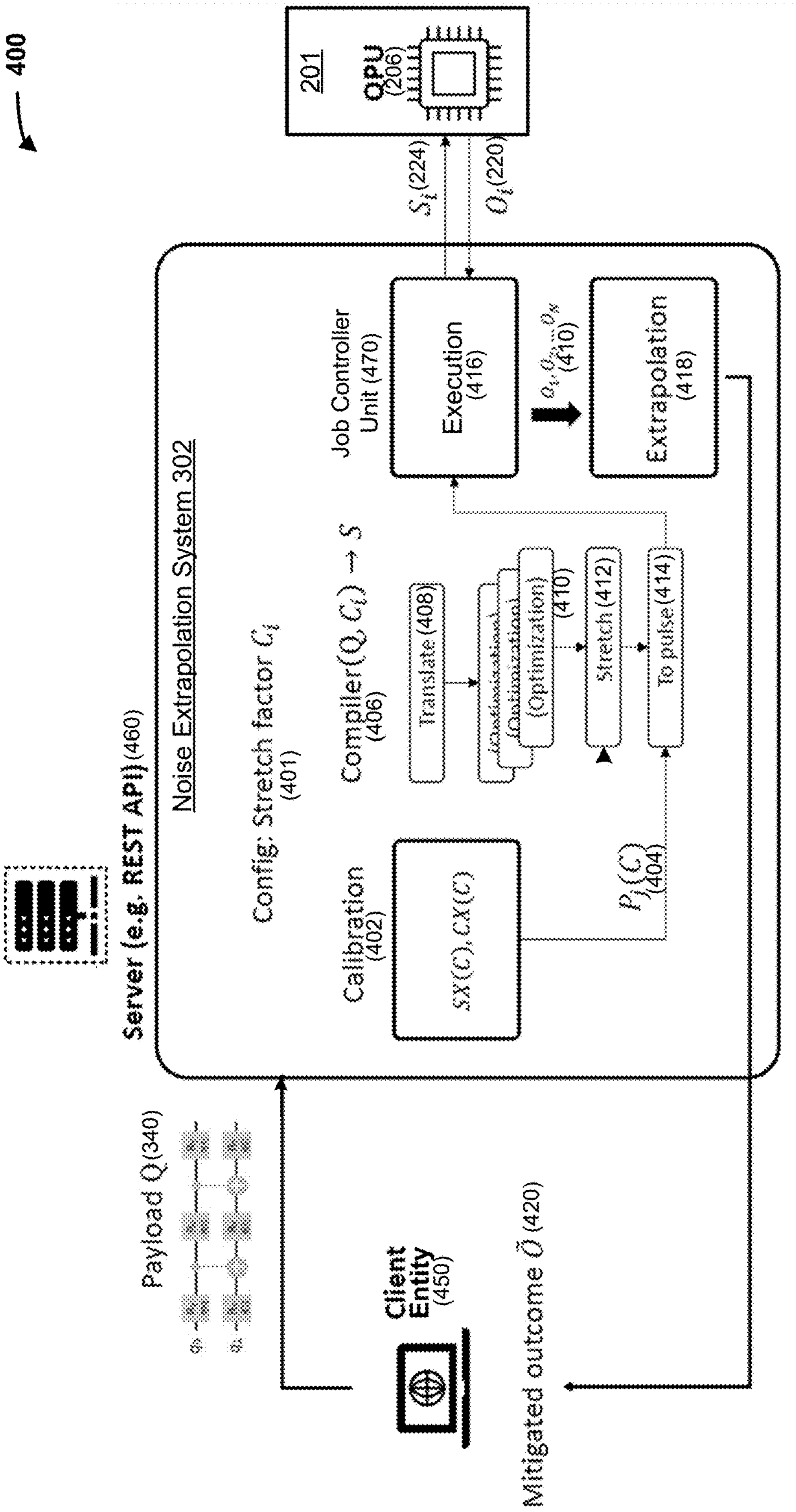
FIG. 4 illustrates a schematic diagram of example operations that can be performed by the noise extrapolation system of FIG. 3, in accordance with one or more embodiments described herein.

Turning briefly to FIG. 4, and still referring to FIG. 3, in one or more embodiments, use of the noise extrapolation system 302 can be hosted over a server 460, for use by one or more client entities 450. The dotted-line box surrounding the symbol of the server 460 is meant to illustrate that the noise extrapolation system 302 can be comprised by and/or hosted over the server 460. As illustrated, a client entity 450 can provide a payload (e.g., a quantum circuit 340) for being noise mitigated by the noise extrapolation system 302 and executed by the quantum system 201 based on one or more quantum job requests 224 provided by the noise extrapolation system 302 to the quantum system 201.

Discussion next turns briefly to the processor 306, memory 304 and bus 305 of the noise extrapolation system 302. For example, in one or more embodiments, the noise extrapolation system 302 can comprise the processor 306 (e.g., computer processing unit, microprocessor, classical processor, quantum processor and/or like processor). In one or more embodiments, a component associated with noise extrapolation system 302, as described herein with or without reference to the one or more figures of the one or more embodiments, can comprise one or more computer and/or machine readable, writable and/or executable components and/or instructions that can be executed by processor 306 to provide performance of one or more processes defined by such one or more component and/or instruction. In one or more embodiments, the processor 306 can comprise the obtaining component 310, pulse calibration component 312, parameterizing component 314, compiling component 316, execution component 318 and/or extrapolation component 320.

In one or more embodiments, the noise extrapolation system 302 can comprise the computer-readable memory 304 that can be operably connected to the processor 306. The memory 304 can store computer-executable instructions that, upon execution by the processor 306, can cause the processor 306 and/or one or more other components of the noise extrapolation system 302 (e.g., obtaining component 310, pulse calibration component 312, parameterizing component 314, compiling component 316, execution component 318 and/or extrapolation component 320) to perform one or more actions. In one or more embodiments, the memory 304 can store computer-executable components (e.g., obtaining component 310, pulse calibration component 312, parameterizing component 314, compiling component 316, execution component 318 and/or extrapolation component 320).

The noise extrapolation system 302 and/or a component thereof as described herein, can be communicatively, electrically, operatively, optically and/or otherwise coupled to one another via a bus 305. Bus 305 can comprise one or more of a memory bus, memory controller, peripheral bus, external bus, local bus, quantum bus and/or another type of bus that can employ one or more bus architectures. One or more of these examples of bus 305 can be employed.

In one or more embodiments, the noise extrapolation system 302 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the noise extrapolation system 302 and/or of the non-limiting system 300 can reside in the cloud, and/or can reside locally in a local computing environment (e.g., at a specified location).

In addition to the processor 306 and/or memory 304 described above, the noise extrapolation system 302 can comprise one or more computer and/or machine readable, writable and/or executable components and/or instructions that, when executed by processor 306, can provide performance of one or more operations defined by such one or more components and/or instructions.

Turning now to the additional components of the noise extrapolation system 302 (e.g., obtaining component 310, pulse calibration component 312, parameterizing component 314, compiling component 316, execution component 318 and/or extrapolation component 320), generally, the noise extrapolation system 302 can perform a set of operations, one or more of which can be repeated, for mitigating noise caused by execution of one or more quantum gates of the quantum circuit 340. It will be appreciated that where suitable, operation can be scaled to perform one or more process, at least partially in parallel with one another, for mitigating noise of one or more quantum gates of the quantum circuit 340, at least partially in parallel with one another, or for mitigating noise relative to one or more quantum circuits, at least partially in parallel with one another.

Turning first to the obtaining component 310, this component, at the classical noise extrapolation system 302, can identify, search, receive, transfer and/or otherwise obtain the quantum circuit 340 for which noise mitigation is being sought. In one or more embodiments, the obtaining component 310 can identify, search, receive, transfer and/or otherwise obtain a stretch factor C or set of stretch factors $C_1$, $C_2$, . . . $C_N$ for use in generating a stretched pulse schedule S(C) by the compiling component 316, to be described below in detail.

Turning now to FIGS. 4 and 6 to 8, in addition to still referring to FIG. 3, the pulse calibration component 312 can perform a set of calibrations 420 to thereby output a modified pulse sequence based on an initial pulse sequence. Notably, as will be detailed below, the modified pulse sequence comprises an echo pulse sequence comprising an echo structure, such as an echo-cross resonance (ECR) structure or other higher order echo structure. The set of calibrations are illustrated at the schematic 800 of FIG. 8, and will be detailed below. The initial pulse sequence can be provided by an entity (e.g., client entity) providing the quantum circuit 340, can be obtained from a storage, based on quantum gates of the quantum circuit 340, and/or can be generated by the pulse calibration component 312, again based on quantum gates of the quantum circuit 340. The storage can comprise any suitable cache, memory, log, database and/or the like accessible by the noise extrapolation system 302.

Figure 6:
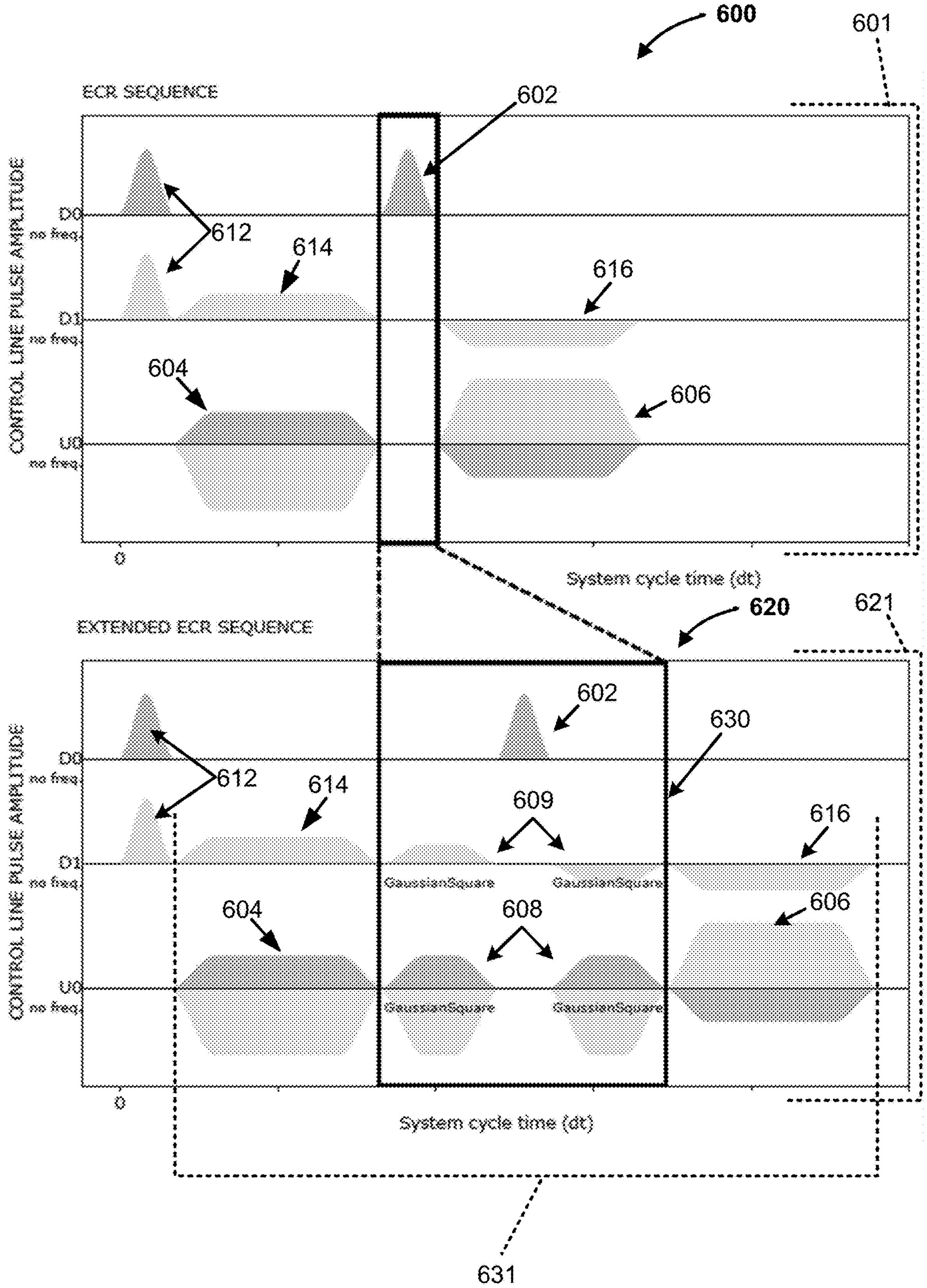
FIG. 6 illustrates a graph of an initial pulse sequence to be modified into a modified pulse sequence by the noise extrapolation system of FIG. 3, in accordance with one or more embodiments described herein.

First, however, to provide visuals in connection with the general intent of the calibration, FIG. 6 illustrates a pulse graph 600 of an initial pulse sequence 601 and a pulse graph 620 of a modified pulse sequence 621, based on the calibration performed by the pulse calibration component 312. Each of these echo pulse sequences is based on an ECR echo structure, although other echo structures can be employed where suitable. Each of these echo pulse sequences can be, in one or more embodiments, integrated into a longer modified pulse sequence, which can comprise one or more additional same or different echo pulse sequences, depending on the quantum gates of the quantum circuit for which execution is to be controlled by the modified pulse sequence.

As illustrated at each of the pulse graphs 600 and 620, control line pulse amplitudes (y-axis) for three different control lines are graphed against system cycle time in units of delta-time (dt). As illustrated at pulse graph 600, the gate (e.g., X1), represented by the pulse 602 at the drive line D0 for the control qubit, can be executed employing an echo pulse sequence (here an ECR sequence). An X1 gate is gate that applies X-rotation on a control qubit to flip the state of the control qubit. The D1 control line represents the drive applied to the target qubit at the frequency of the target qubit. The U0 control line represents the pulse applied to the control qubit at the frequency of the target qubit, to drive one qubit at the frequency of the other. Pulses at the U0 control line include a positive tone 604 and a negative tone 606, as part of the ECR echo structure. Pulses 612 represent one or more other qubit gates employed to convert the gate represented by the pulse 602 into a CNOT gate.

Using the noise extrapolation system 302 described herein, and particularly employing the pulse calibration component 312, the modified pulse sequence 621 of the pulse graph 620 can be generated based on the initial pulse sequence 601 of the pulse graph 600. As a further result of the noise extrapolation system 302, and subsequent employment of the calibrating component 316, various iterations (e.g., shots) of the modified pulse sequence 621 of the pulse graph 620 can be operated without additional calibration per-shot, as is undesirably the case in existing frameworks.

For purposes of reference, it is noted that the term modified pulse sequence 621 is employed to refer to the entirety of the pulses of the pulse graph 620. The term echo extender sequence portion at 630 is employed to refer to only the pulses of the pulse graph 620 within the box 630. The term echo pulse sequence 631 is employed to refer to the pulses within the box 630, in addition to the positive tone 604 and negative tone 606.

That is, as illustrated at the pulse graph 620, an echo pulse sequence 631 can be generated including an echo extender sequence portion at 630. The echo pulse sequence 631 of the pulse graph 620 comprises the positive tone 604 and the negative tone 606, but also further comprises stretchable (e.g., having an extendable duration) echo extender tones 608 and 609 at the control lines D1 and U0. While each of the control lines D1 and U0 have the echo extender tones, reference herein is made to these tones 608 and 609 in aggregate as a set of echo extender tones.

Upon calibration by the pulse calibration component 312 of one or more parameters (e.g., amplitude) for the set of echo extender tones, the set can be inserted as a part of the echo structure of the echo pulse sequence, between the positive tones 604, 614 and the negative tones 606, 616. These echo extender tones 608 and 609 can be calibrated, such as to determine an optimal amplitude to utilize for each of the echo extender tones 609 (e.g., each having the same amplitude). Furthermore, as will be explained below, but briefly introduced explained relative to FIG. 7, the echo extender tones 608 and 609 are stretchable in that a duration (e.g., along the x-axis of the pulse graphs 600 and 620) of these echo extender tones 608 and 609 can be scaled (e.g., increased/decreased) based on parameterization of the echo pulse sequence 631 by the stretch factor C. The stretch factor C can be a placeholder such that for different iterations of the echo pulse sequence (e.g., generated for a same quantum circuit/same quantum gate), the stretch factor C can be replaced by different stretch factors (e.g., different stretch factor quantities).

Figure 7:
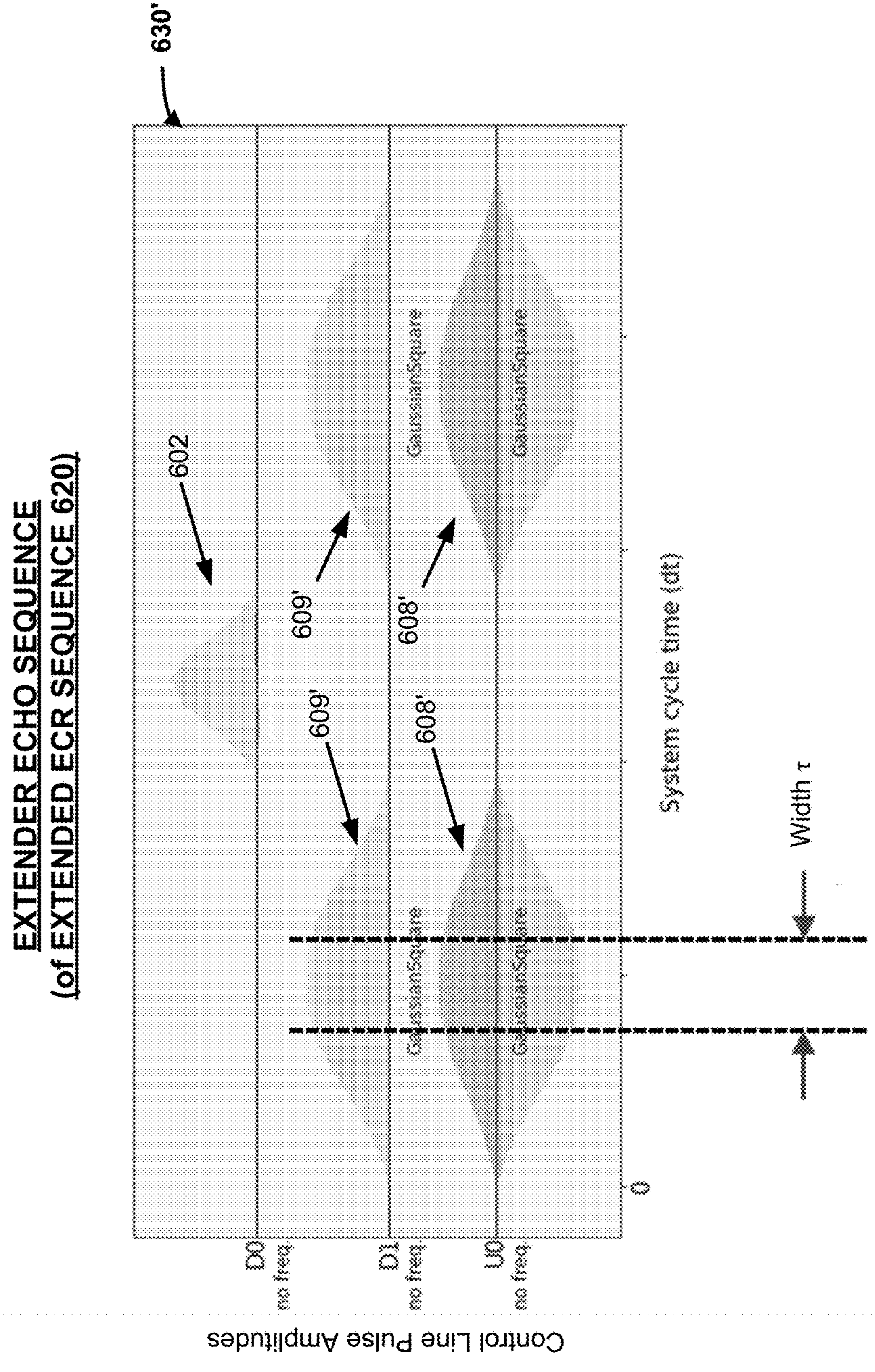
FIG. 7 illustrates a graph showing a visual enlargement of a portion of the echo pulse sequence of the modified pulse sequence of FIG. 6.

For example, turning next to FIG. 7, the pulse graph 630' illustrates a modified partial visual enlargement of the echo extender sequence portion at 630 of the pulse graph 620 of FIG. 6. As compared to the echo extender sequence portion at 630 of the pulse graph 620, the echo extender tones 608' and 609' (FIG. 7) of the echo extender sequence portion at 630' are stretched by a width t, based on application of a different stretch factor C, which as explained, controls the duration of the echo extender tones 608' and 609'. It is noted that the implementation of the extension of the duration and application of the different widths t for different stretch factors C can be realized by identifying a central portion of the respective echo extender tones that can be stretched (e.g., along the x-axis of system cycle time).

Based on the above, and returning to FIG. 6, multiple shots of the quantum gate can be executed using different control pulse sequences (e.g., the different modified pulse sequences 621 having the different stretch factors C) without time-intensive calibration required for each respective echo pulse sequence. That is, the calibration performed by the pulse calibration component 312 is completed a single time and is not repeated for additional iterations of the modified pulse sequence 621 when using different stretch factors. As such, the different modified pulse sequences can be generated and executed, with varying durations (e.g., along the x-axis of the pulse graph 620) of the echo extender tones 608, without a full re-calibration of all pulse parameters of the respective echo pulse sequences 631 of these different modified pulse sequences 621.

Figure 8:
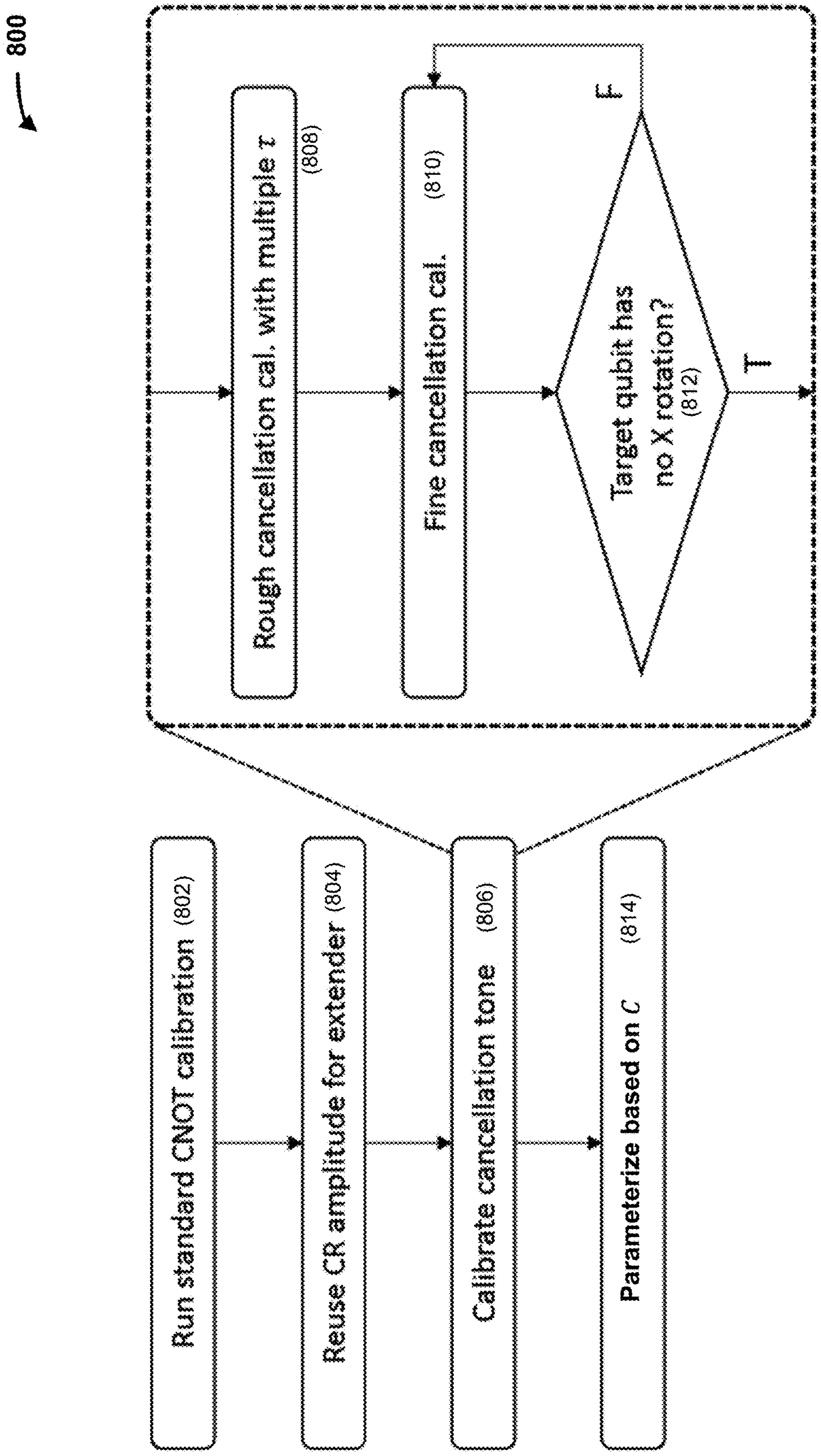
FIG. 8 illustrates another schematic diagram of example operations that can be performed by the noise extrapolation system of FIG. 3, in accordance with one or more embodiments described herein.

Turning now to FIG. 8, but still referring to FIG. 6, the set of calibrations illustrated at the schematic 800 of FIG. 8 will be detailed. This set of calibrations (steps 802, 804, 806, 814 and substeps 808-812) can be performed by the pulse calibration component 312 and the parameterizing component 314 to generate the modified pulse sequence 621 of FIG. 6.

A first calibration that can be performed by the pulse calibration component 312 can comprise a gate calibration, such as a CNOT calibration at step 802. The intent of this CNOT calibration step 802 can be to obtain a cross-resonance (CR) amplitude from the CNOT calibration step 802 for use in the echo pulse sequence 631 of the modified pulse sequence 621. The tone 604/606 at the U0 control line (of graph 600) is the CR tone having the amplitude that is reused.

That is, the pulse calibration component 312 can calibrate a controlled-NOT (CNOT) gate generated from a cross-resonance (CR) interaction and based on the quantum gate for which noise mitigation is desired. At step 804, the pulse calibration component 312 can employ the amplitude of the pulse driving the CR interaction as an amplitude of the positive tones 604, 614 and of the negative tones 606, 616 of the echo pulse sequence 631 of the modified pulse sequence 621 output by the pulse calibration component 312.

Also at step 804, the pulse calibration component 312 can generate the pair of echo extender tones 608 and employ as an amplitude for each of these echo extender tones 608 the amplitude of the pulse driving the CR interaction. Accordingly, tones 604, 614, 606, 616 and 608 of the modified pulse sequence of the pulse graph 620 each are generated having the same amplitude, which is the amplitude of the pulse driving the aforementioned CR interaction. By using the same amplitude (and also same phase) for each of these tones, the noise levels of the modified pulse sequence (e.g., at pulse graph 620) are maintained as the same as the noise levels as in the original gate (e.g., at the initial pulse sequence of the pulse graph 600).

Another step that can be performed by the pulse calibration component 312, particularly related to the echo extender tones 609 described above, can comprise generation of the pair of echo extender tones 609. This generation can comprise calibration of an echo extender tone parameter for the set of echo extender tones (and particularly for the pair of echo extender tones 609), for use with the echo pulse sequence 631 of the initial pulse sequence 601 (to make the modified pulse sequence 621) for controlling execution of selected the quantum gate of the quantum circuit 340. The intent of this calibration step 806 can be to calibrate an echo extender tone 609 to use in constructing the full set of echo extender tones (including echo extender tones 608 and 609) for insertion into the initial pulse sequence 601 to be used for execution of the quantum gate, while mitigating noise caused by execution of the quantum gate. Calibration of the pair of echo extender tones 609 can allow for the tones 609 to remove unwanted drive tones of the modified pulse sequence of pulse graph 620, allowing for preservation of same effects of the original gate (e.g., at the initial pulse sequence of the pulse graph 600). Accordingly, to achieve this preservation, a subsequent intent of the calibration step 806 can be to insert the set of echo extender tones 609 into the echo pulse sequence 631 (and even more particularly into the echo extender sequence portion at 630), with each echo extender tone 609 having the same calibrated echo extender tone parameter (e.g., amplitude).

At least a portion of the calibrating, performed at 402 of the schematic 400 of FIG. 4, can be generally based on operation of a plurality of iterations of an echo extender tone 609 using a plurality of varying durations of the echo extender tone 609. Once a desired echo extender tone parameter, such as an amplitude, is identified, the pulse calibration component 312 can insert the set of echo extender tones 609, having the echo extender tone parameter, into the echo pulse sequence 631 of the initial pulse sequence 601 (e.g. at the control line D1), thus at least partially resulting in generation of the modified pulse sequence 621 (at the pulse graph 620) for use in controlling the execution of the quantum gate of the quantum circuit 340.

It is noted that where amplitude is the parameter being calibrated for the echo extender tones 609, phase for these echo extender tones 609 likewise can be determined based upon the calibrated amplitude.

Figure 9:
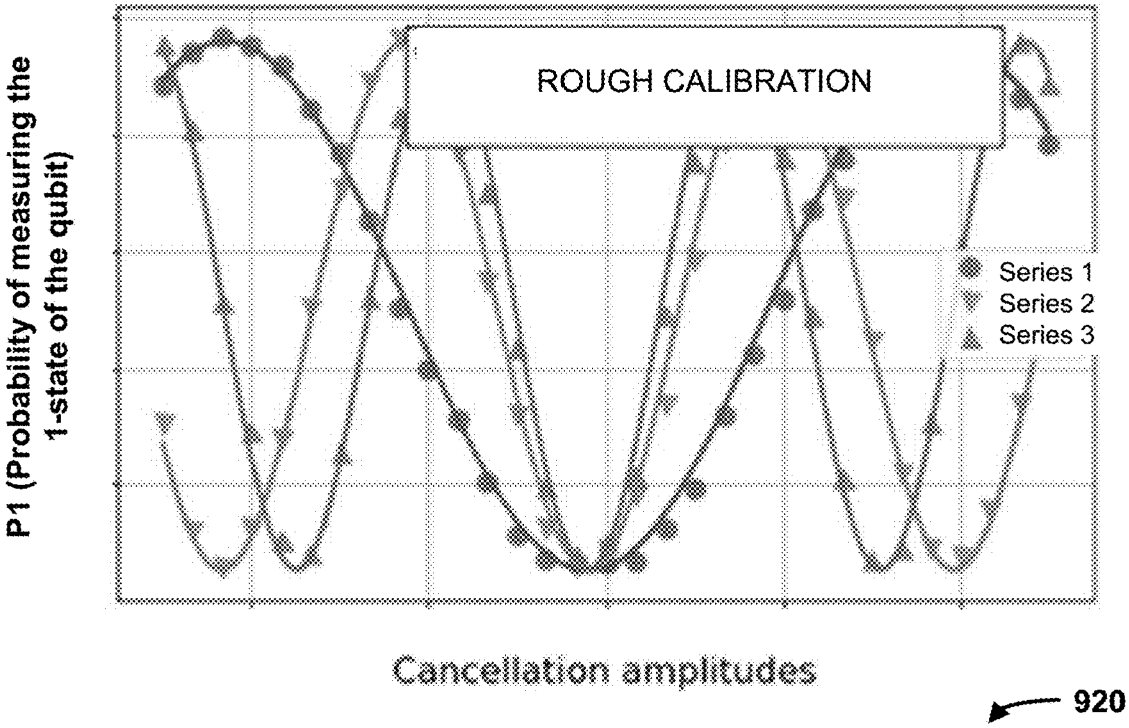
FIG. 9 illustrates a first graph showing rough calibration of an echo extender tone by applying a set of varying durations of an echo extender tone of the set of echo extender tones, in accordance with one or more embodiments described herein.
Figure 9:
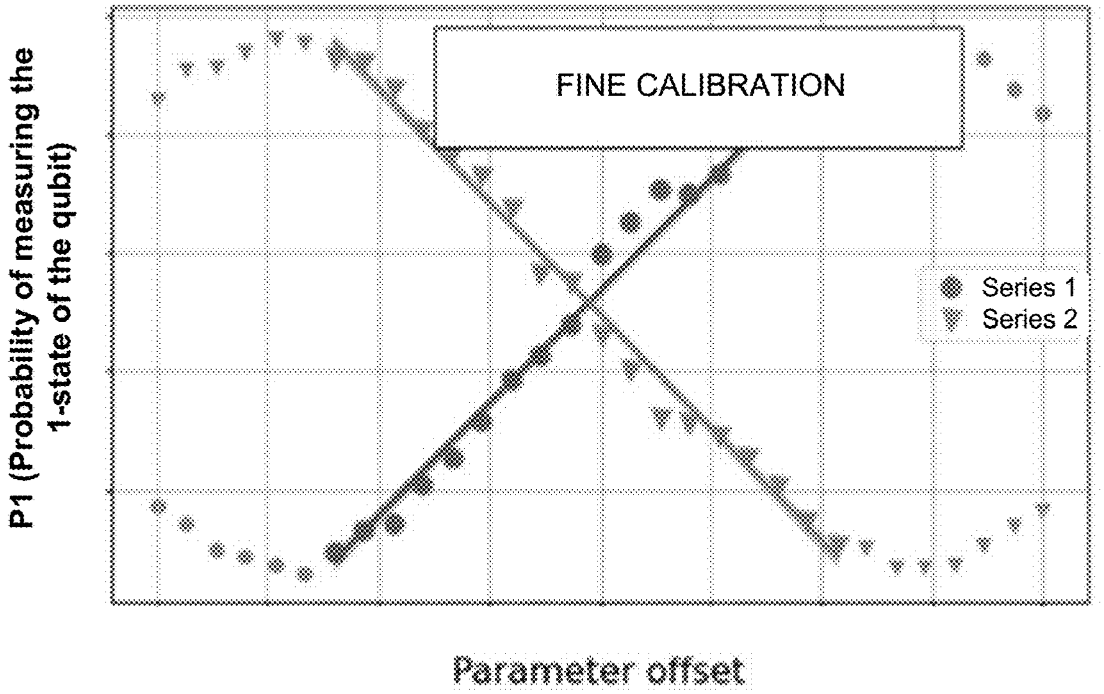

More particularly, as indicated above, the calibration of the echo extender tones 609 can be a three-tiered process. For example, turning to FIG. 8, step 808 (first tier) can comprise a rough calibration step executed by the pulse calibration component 312 to calibrate the echo extender tone parameter by directing execution of a plurality of iterations of the not-yet-calibrated echo extender tone 609. That is, the pulse calibration component 312 can direct the quantum system 201, such as by sending a quantum job request 224 that is obtained by the quantum operation component 203 and implemented by the quantum operation component 203 using the waveform generator 210, to operate the plurality of different iterations of the echo extender tone 609 having different values for a parameter (e.g., different values for amplitude) over different durations (e.g., series 1, 2 and 3) of the tone. As illustrated at the rough calibration graph 900 of FIG. 9, cancellation parameters, here amplitude, (e.g., for the noise cancellation tone 609 as the echo extender tone of an ECR structure) can be graphed against probability of measuring the 1-state of the respective qubit (P1). This probability can range from 0 to 1. It is noted that relative to the ECR structure of the illustrated example, the IY term can be assumed as being approximately zero, allowing for avoidance of calibration of another parameter of the corresponding angle.

Put another way, to rough calibrate the echo extender tones 609, the pulse calibration component can direct scanning of the amplitude (x-axis of graph 900 of FIG. 9) of the echo extender tones 609 for different durations t of the echo extender tones 609 and 608. It is noted that the other parameters, such as the amplitude and phase of the echo extender tones 608 are kept constant during the rough calibration.

An output of the rough calibration can be a target amplitude (e.g., the exemplary parameter being calibrated relative to FIG. 9) that is at an intersection of the amplitude vs. probability results. It is appreciated that an intersection can comprise an actual overlapping of one or more of the results and/or a result can be based on an extrapolated common-most amplitude or best fit that may or may not be directly on one or more of the resulting graphed results.

At step 810, based on a result of the rough calibration step 808, the pulse calibration component 312 can perform a fine calibration of the echo extender tone parameter being calibrated at a higher granulation than a granulation of the rough calibration. For example, as illustrated at the graph 920 of FIG. 9, an exemplary fine calibration can comprise using a set of two different initial quantum states to determine an optimal parameter value at an intersection of measurements of the two different initial quantum states. Graph 920 illustrates parameter offset graphed against P1. In one or more embodiments, performance of steps 808 and 810 in sequence can take approximately 10 or fewer minutes to complete.

Based on an echo extender tone amplitude determined from the fine calibration at step 810, a third tier at step 812 can comprise determining whether rotation of a target qubit to which the resulting echo extender tone 609 (with the resulting echo extender tone amplitude) is applied satisfies a threshold for minimization of the rotation. Where the threshold is not satisfied, additional fine calibration of the echo extender tone amplitude can be performed (e.g., the pulse calibration component 312 can proceed from step 812 back to step 810). Where the threshold is satisfied, the echo extender tone amplitude can be employed, by the pulse calibration component 312, for a set of echo extender tones inserted into the echo pulse sequence (e.g., employed for the pair of echo extender tones 609 of the full set of echo extender tones).

That is, the pulse calibration component 312 can insert the set of echo extender tones 608 and 609 into the echo pulse sequence 631 of (and/or resulting in) the modified pulse sequence 621 output by the pulse calibration component 312.

As a result thereof, a same amplitude is employed for each echo extender tone 608, and a different same amplitude is employed for each echo extender tone 609, which amplitudes are not altered, changed and/or re-calibrated when stretching the echo extender tone 608 as a function of the stretch factor C. As illustrated at the modified pulse sequence 621 of FIG. 6, the echo extender tones 609 have a different amplitude, exemplarily illustrated as being lesser, than the amplitude of the echo extender tones 608. Further, the amplitude and duration of the positive tones 604, 614 and of the negatives tone 606, 616 are not altered, changed and/or re-calibrated when varying the stretch factor C. Likewise, the amplitude and duration of the quantum gate represented at the control line D0 also are not altered, changed and/or re-calibrated when varying the stretch factor C.

Before turning to step 814, it is noted that the pulse calibration component 312 can perform one or more additional and/or alternative processes. For example, the pulse calibration component 312 can cache one or more calibrations, determined parameters and/or echo pulse sequences for use during future calibrations. In one or more embodiments, the pulse calibration component 312 can use a previously calibrated echo extender pulse, such as via such cache, to interpolate one or more parameters for use with an echo extender pulse being generated. In one or more embodiments, the pulse calibration component 312 can determine that one or more calibration processes will not be run, but instead can obtain an echo extender pulse, parameter and/or echo pulse sequence from a cache or other storage. In one or more embodiments, the pulse calibration component 312 can determine that one or more calibration processes will not be run, but instead can operate a model, AI-based or non-AI-based, to determine one or more echo extender pulses, such as based on previous iterations of calibration.

Next, at step 814 of FIG. 8/step 404 of FIG. 4, the parameterizing component 314 can parameterize each of the echo extender tones 608, 609 of the set of echo extender tones using a same scalable stretch factor (e.g., referred to as C) for stretching respective durations of the echo extender tones 608 and 609. This parameterization can provide a placeholder stretch factor that can be replaced during a stretching step 412 (FIG. 4) performed by the compiling component 316. It is noted again that the positive and negative tones of the respective echo pulse sequence 631, and the gate at the drive line D0 of the respective echo pulse sequence 631, are not stretched.

It is noted that in one or more other embodiments, the aforementioned parameterizing can be performed additionally (e.g., in cooperation with) and/or alternatively (e.g., not by the parameterizing component 314) by the pulse calibration component 312 and/or by the compiling component 316.

It is noted that the stretch factor C does not have a practical effect on the calibration performed by the pulse calibration component 312, and thus results of the pulse calibration component 312 are not based on the stretch factor C.

That is, based on the stretching step 412 (FIG. 4), to be further described below, varying stretch factor quantities can be employed as the scalable stretch factor, such as for respective varying iterations of the modified pulse sequence, without additional calibration being performed by the pulse calibration component relative to each different stretch factor quantity employed. This can be at least partially due to use of echo extender tones 609 for each of the varying iterations of the modified pulse sequence having a same calibrated echo extender tone amplitude, and instead varying the duration (e.g., stretching) of the echo extender tones 608, 609 based on the varying stretch factors employed (e.g., having the varying stretch factor quantities). Because each of the echo extender tones 608, 609 is parameterized with the same stretch factor, each of these each extender tones 608, 609 is stretched a same amount (e.g., a same duration is added to each echo extender tone 608, 609).

Indeed, in the exemplary CR scheme, the base positive-XI-positive sequence cancels out the non-local interaction terms of the quantum gate being implemented can be cancelled out in addition to cancellation of phase error on the control qubit. The rest of the local terms of the respective local interaction of the quantum gate being implemented, are eliminated by the calibration of the extender amplitude (e.g., the parameter of the echo extender tones 609). Use of the set of echo extender tones 608/609 suppresses and cancels out unwanted interactions at a Hamiltonian level. This means that use of the set of echo extender tones 608/609 implements the respective quantum gate on the control qubit regardless of the gate time (e.g., regardless of the different durations caused to be implemented by use of the stretch factor C). Thus, calibration is not employed for each different stretch factor quantity (e.g., each stretch factor C replacing the placeholder stretch factor C. As a result, this echo extender technique can remove the overhead of maintaining multiple copies of a respective basis gate set at different stretch factors.

For further information regarding this advantage, relative to the particular example illustrated at FIGS. 6 and 7, the echo extender pulse sequence 631 illustrated (at graphs 620 and 630) comprises CR(+)–XI–CR(+) which includes the respective echo extender tones 608 and 609 (e.g., cancellation tones for the ECR example) on the target qubit. This sequence eliminates non-local ZX terms in addition to reduction of ZI terms due to off-resonant drives. The rest of the local IX term is eliminated by the echo extender tones 608 and 609.

Discussion next turns again to FIG. 4 and also to discussion of the compiling component 316 and the compiling step 406 comprising the compiling sub-steps 408 to 412. Generally, compiling step 406 can comprise generation, by the compiling component 316, of a stretched pulse schedule comprising a plurality of iterations of the modified pulse sequence 621 output from the pulse calibration component 312.

An initial step can comprise obtaining, such as from the obtaining component 310, a stretch factor C and the quantum payload 340 (Q), and from the pulse calibration component 312, the modified pulse sequence (621) $p_j(C)$.

It is noted that the stretch factor C consumed can be a placeholder, a stretch factor function, a set of stretch factors $C_1, C_2, \ldots C_N$. That is, a full set of stretch factors $C_1, C_2, \ldots C_N$ can be obtained by the obtaining component 310, the compiling component 316 can generate a set of stretch factors based on the quantum payload 340, or the compiling component 316 can modify an obtained set of stretch factors based on the quantum payload 340. For example, the compiling component 316 can identify or amend one or more stretch factors and/or a range of stretch factors based on a quantum gate duration or overall quantum circuit duration.

Next, at step 408, the compiling component 316 can translate the payload quantum circuit 340 into a sequence of one or more gates to be executed by a sequence of pulses. In one or more embodiments, one or more quantum gates can have been identified and a list or other data obtained by the obtaining component 310 representing those one or more quantum gates for which pulse schedule generation is requested by the noise extrapolation system 302. In one or more embodiments, the compiling component 316 and/or the pulse calibration component 312 can analyze the quantum circuit 340 to identify one or more quantum gates upon which the noise extrapolation system 302 can operate. In one or more embodiments, the compiling component 316 and/or the pulse calibration component 312 can employ a model, AI-based or non-AI-based, to analyze the quantum circuit 340 and identify such one or more quantum gates.

Step 410 can comprise optimization steps to generate the pulse schedule S(C) as a function of the stretch factor C. This can comprise generally mapping a modified pulse sequence 321 (output from the pulse calibration component 312) by a sequence of basis gates being functions of the stretch factor C. More particularly, step 410 can comprise consuming a stretch factor C and the quantum payload 340 (Q), along with the modified pulse sequence $p_j(C)$. A compiler pass, by the compiling component 316, can comprise translating a quantum gate $g_j \in Q$ into a sequence of stretchable basis gates $b_j$. A successor compiler pass, by the compiling component 316, can comprise replacing one or more basis gates with modified basis gates as functions of the stretch factor C (e.g., $b_j \rightarrow \tilde{b}_j(C)$). Another successor compiler pass, by the compiling component 316, can map $\tilde{b}_j(C)$ to a stretchable pulse sequence $p_j(C)$ (e.g., a modified pulse sequence output from the pulse calibration component 312). This mapping can be performed for a plurality of modified pulse sequences using respective different stretch factors. The plurality of mapped modified pulse sequences can be assembled to generate the pulse schedule S(C) as a function of the stretch factor C.

At step 412, during the mapping and/or subsequent thereto, the echo extender tones of the respective echo pulse sequences 631 can be stretched using the set of stretch factors $C_1, C_2, \ldots C_N$ having replaced the placeholder stretch factor C. This results in compilation of a stretched pulse schedule S(C) comprising a set of the stretched pulse sequences which can be sent (e.g., at step 414) to the job controller unit 470 (e.g., to the execution component 318).

Further it is noted that single qubit gates such as SX and X can be stretched, such as employing the compiling component 316, by adjusting the pulse amplitude without calibration. Because a single qubit gate can be driven in a linear regime, adjusting the amplitude to keep the same pulse area can result in moderate gate fidelity at different stretch durations. Also, in one or more embodiments, a set of echo extender pulses can be employed, such as by the compiling component 316, in the pulse schedule of a cross-cross resonance gate.

Figure 10:
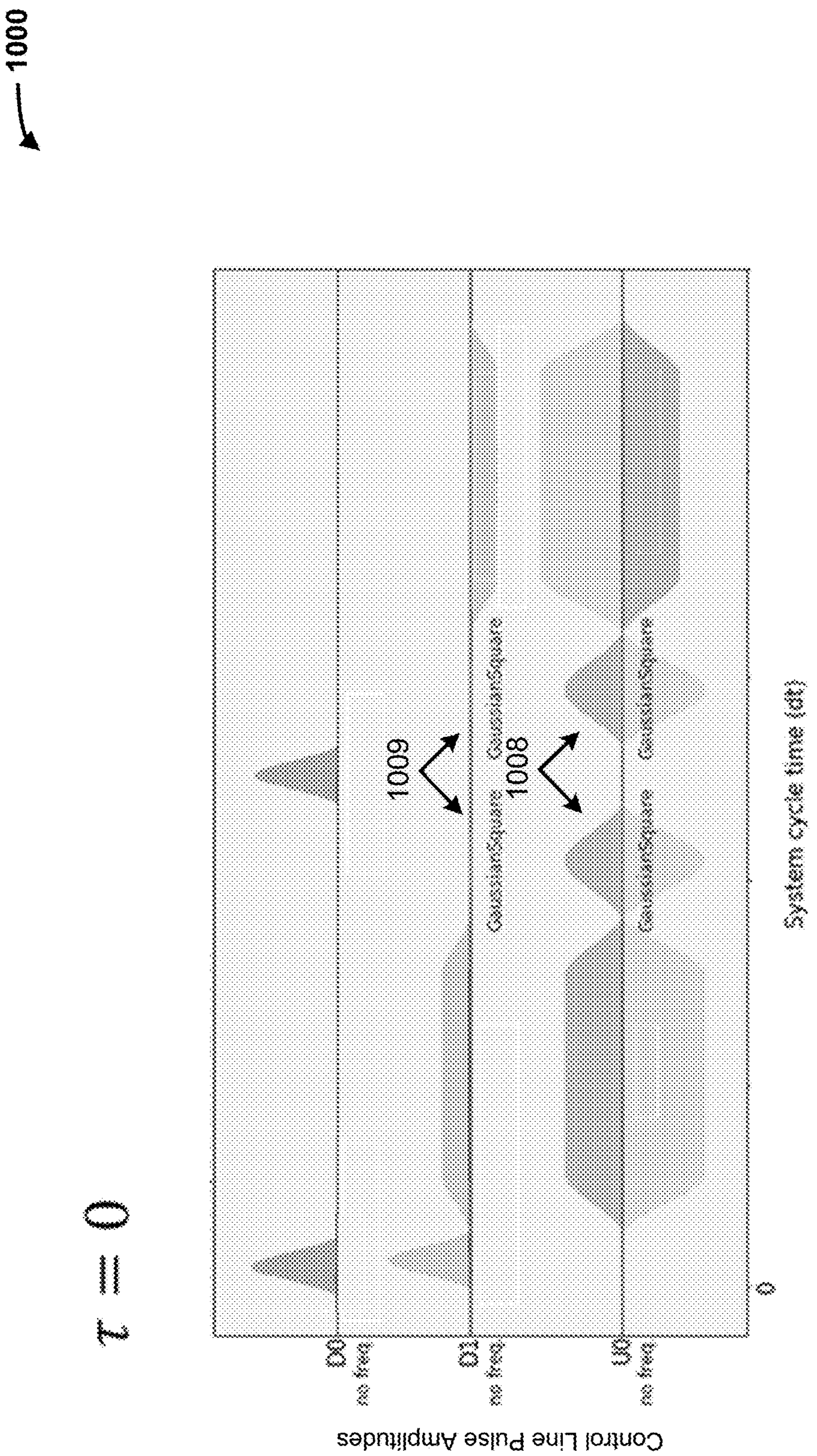
FIG. 10 illustrates a graph of a first iteration of a modified pulse sequence, from the noise extrapolation system of FIG. 3, where the first iteration uses a stretch factor resulting in a first duration for a respective extender pulse, in accordance with one or more embodiments described herein.
Figure 11:
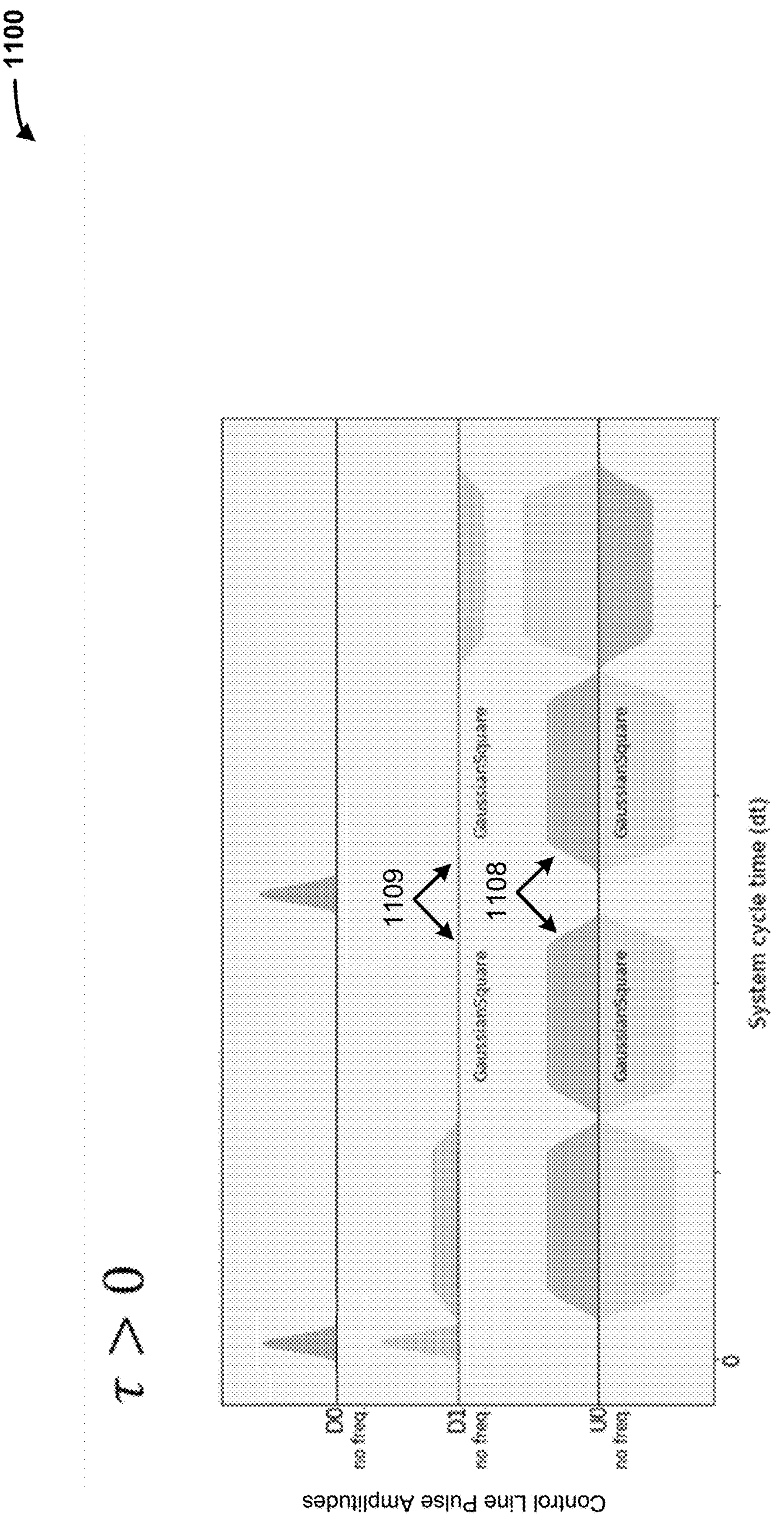
FIG. 11 illustrates a graph of a second iteration of a modified pulse sequence, from the noise extrapolation system of FIG. 3, where the second iteration uses a stretch factor resulting in a second duration for a respective extender pulse, in accordance with one or more embodiments described herein.

Turning briefly to FIGS. 10 and 11, based on the stretching performed by the compiling component 316, illustrated are a set of pulse graphs (e.g., pulse sequence graphs). Together, graph 1000 of FIG. 10 and graph 1100 of FIG. 11 generally illustrate that the total respective quantum gate duration can be stretched by $2\tau$ without extra calibration. It is noted that $\tau$ represents an arbitrary duration and the illustrated echo extender technique reproduces identical CR noise through the duration $\tau$.

Graph 1000 of FIG. 10 represents use of a $\tau \rightarrow 0$ resulting from a first stretch factor C, while graph 1100 of FIG. 11 represents use of a $\tau > 0$ resulting from a second stretch factor C. That is, the echo extender pulses 1008 and 1009 (small and thus not visible) have a small amount of extra CR duration, while the echo extender pulses 1108 and 1109 have a larger amount of extra CR duration, as compared to a non-modified pulse sequence (not shown). Nonetheless, both pulse sequences illustrated are logically equivalent in the absence of noise.

Overall, as compared to the existing analog ZNE method illustrated at FIG. 5, the extender echo method performed by the noise extrapolation system 302 and illustrated at FIGS. 10 and 11 provides an amplified noise that is closer in nature to that of the original circuit (e.g., non-modified by the noise extrapolation system 302).

Discussion next turns to operations performed by the execution component 318 and the extrapolation component 320 of a job controller unit 470 of the noise extrapolation system 302.

At step 416, a number of iterations of the quantum circuit can be directed (e.g., by the execution component 318) to be executed (e.g., by the quantum operation component 203 in conjunction with the waveform generator 210 operating on the quantum processor 206) employing the stretched pulse schedule S(C) as control pulses, and thus employing the different ones of the stretch factors $C_1, C_2, \ldots C_N$. Quantum measurement readout can be performed, such as by the readout electronics 213, for each iteration, resulting in a set of outcomes $O_1, O_2, \ldots O_N$ (e.g., quantum measurement readouts 220 sent to the noise extrapolation system 302). At step 418, using a method of analysis, such as interpolation, by the extrapolation component 320, a noise-free outcome $\tilde{O}$ can be estimated from the outcomes $O_1, O_2, \ldots O_N$.

Figure 12:
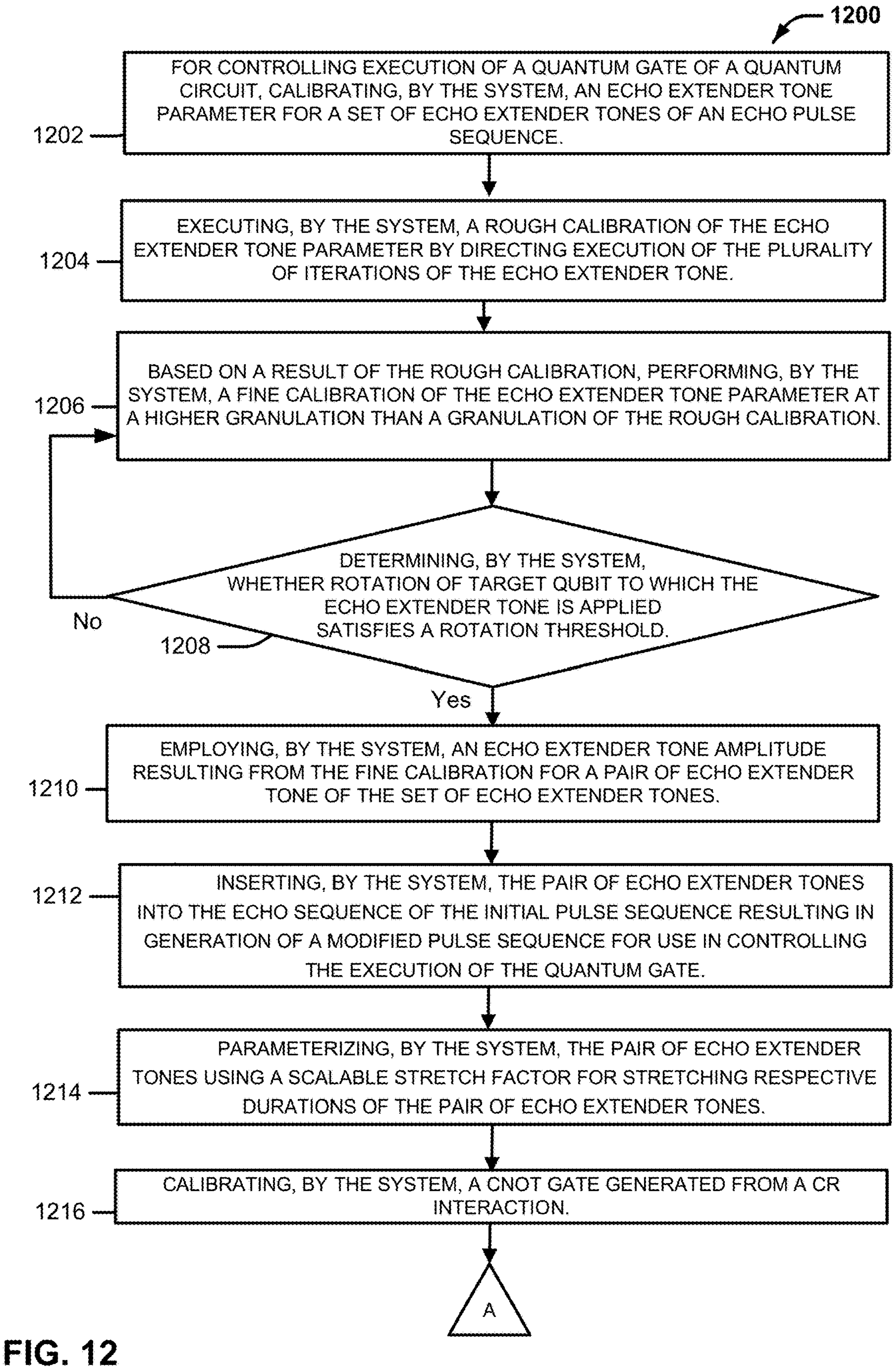
FIG. 12 illustrates a flow diagram of an example, non-limiting computer-implemented method that can facilitate noise mitigation of a quantum circuit, in accordance with one or more embodiments described herein.
Figure 13:
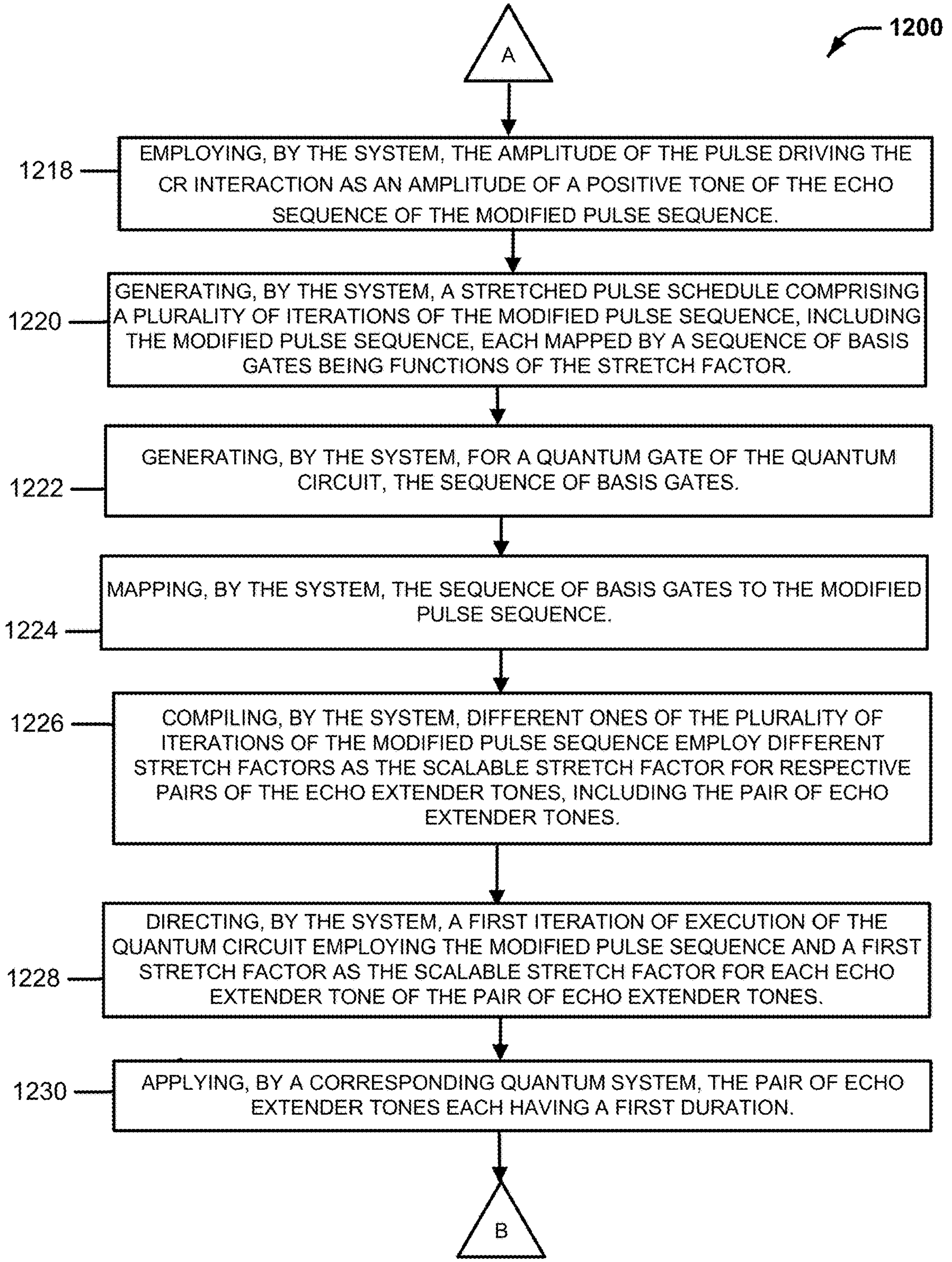
FIG. 13 illustrates a continuation of the flow diagram of FIG. 12, of an example, non-limiting computer-implemented method that can facilitate noise mitigation of a quantum circuit, in accordance with one or more embodiments described herein.

Referring now to FIGS. 12 to 14, illustrated is a flow diagram of an example, non-limiting method 1200 that can provide a process to mitigate noise of one or more gates of a quantum circuit using the noise extrapolation system 302 of FIG. 3, in accordance with one or more embodiments described herein. While the non-limiting method 1200 is described relative to the noise extrapolation system 302 of FIG. 3, the non-limiting method 1200 can be applicable also to other systems described herein, such as the noise extrapolation system 102 of FIG. 1. Repetitive description of like elements and/or processes employed in respective embodiments is omitted for the sake of brevity.

At 1202, the non-limiting method 1200 can comprise, for controlling execution of a quantum gate of a quantum circuit, calibrating, by a system comprising a processor (e.g., pulse calibration component 312) an echo extender tone parameter for a set of echo extender tones of an echo pulse sequence. This process can employ calculation and analysis at the classical noise extrapolation system 302, using measurements output from the quantum system 201 (e.g., based on use of one or more quantum job requests 224 by the noise extrapolation system 302).

At 1204, the non-limiting method 1200 can comprise executing, by the system (e.g., pulse calibration component 312), a rough calibration of the echo extender tone parameter by directing (e.g., by the pulse calibration component 312) execution (e.g., by the quantum system 201) of the plurality of iterations of the echo extender tone.

At 1206, the non-limiting method 1200 can comprise based on a result of the rough calibration, performing, by the system (e.g., pulse calibration component 312), a fine calibration of the echo extender tone parameter at a higher granulation than the rough calibration. This process can employ calculation and analysis at the classical noise extrapolation system 302, using measurements output from the quantum system 201 (e.g., based on use of one or more quantum job requests 224 by the noise extrapolation system 302).

At 1208, the non-limiting method 1200 can comprise, based on an echo extender tone amplitude resulting from the fine calibration, determining, by the system (e.g., pulse calibration component 312), whether rotation of a target qubit to which the echo extender tone is applied satisfies a rotation threshold. This process can employ calculation and analysis at the classical noise extrapolation system 302, using measurements output from the quantum system 201 (e.g., rotation measurements based on use of one or more quantum job requests 224 by the noise extrapolation system 302).

Where the rotation threshold is not satisfied, the non-limiting method 1200 can proceed back to the fine calibration step 1206 for further fine calibration of the echo extender tone amplitude.

At 1210, the non-limiting method 1200 can comprise, where the rotation threshold is satisfied, employing, by the system (e.g., pulse calibration component 312), the echo extender tone amplitude resulting from the fine calibration for a pair of echo extender tones of the set of echo extender tones. This process can be performed at the classical noise extrapolation system 302.

At 1212, the non-limiting method 1200 can comprise inserting, by the system (e.g., pulse calibration component), the set of echo extender tones into the echo pulse sequence of an initial pulse sequence resulting in generation of a modified pulse sequence for use in controlling the execution of the quantum gate. This process can be performed at the classical noise extrapolation system 302.

At 1214, the non-limiting method 1200 can comprise parameterizing, by the system (e.g., parameterizing component 314), the set of echo extender tones using a scalable stretch factor for stretching respective durations of the set of echo extender tones. This process can be performed at the classical noise extrapolation system 302.

At 1216, the non-limiting method 1200 can comprise calibrating, by the system (e.g., pulse calibration component 312), a controlled-NOT (CNOT) gate generated from a cross-resonance (CR) interaction. This process can employ calculation and analysis at the classical noise extrapolation system 302, using measurements output from the quantum system 201 (e.g., rotation measurements based on use of one or more quantum job requests 224 by the noise extrapolation system 302).

At 1218, the non-limiting method 1200 can employing, by the system (e.g., pulse calibration component 312), the amplitude of the pulse driving the CR interaction as an amplitude of a positive tone of the echo pulse sequence of the modified pulse sequence. This process can be performed at the classical noise extrapolation system 302.

At 1220, the non-limiting method 1200 can comprise generating, by the system (e.g., compiling component 316), a stretched pulse schedule comprising a plurality of iterations of the modified pulse sequence, including the modified pulse sequence, each mapped by a sequence of basis gates being functions of the stretch factor. This process can employ calculation and analysis at the classical noise extrapolation system 302, using measurements output from the quantum system 201 (e.g., rotation measurements based on use of one or more quantum job requests 224 by the noise extrapolation system 302).

At 1222, the non-limiting method 1200 can comprise again generating, by the system (e.g., compiling component 316), for a quantum gate of the quantum circuit, the sequence of basis gates. This process can be performed at the classical noise extrapolation system 302.

At 1224, the non-limiting method 1200 can comprise mapping, by the system (e.g., compiling component 316), the sequence of basis gates to the modified pulse sequence. This process can be performed at the classical noise extrapolation system 302.

At 1226, the non-limiting method 1200 can comprise compiling, by the system (e.g., compiling component 316), different ones of the plurality of iterations of the modified pulse sequence employ different stretch factors as the scalable stretch factor for respective pairs of the echo extender tones, including the set of echo extender tones. This process can be performed at the classical noise extrapolation system 302 and/or at a suitable compiler of the quantum system 201.

At 1228, the non-limiting method 1200 can comprise directing, by the system (e.g., execution component 318), a first iteration of execution of the quantum circuit employing the modified pulse sequence and a first stretch factor as the scalable stretch factor for each echo extender tone of the set of echo extender tones. This directing can be performed at the classical noise extrapolation system 302 (e.g., by the execution component 318), and then, based on a quantum job request 224, at least partially by the quantum system 201 (e.g., by the quantum operation component 203).

At 1230, the non-limiting method 1200 can comprise applying, by the quantum system (e.g., quantum system 201), the set of echo extender tones each having a first duration. The application can be by the waveform generator 210, for example.

At 1232, the non-limiting method 1200 can comprise directing, by the system (e.g., execution component 318), a second iteration of execution of the quantum circuit employing the modified pulse sequence and a second stretch factor as the scalable stretch factor for each echo extender tone of the set of echo extender tones. This directing can be performed at the classical noise extrapolation system 302 (e.g., by the execution component 318), and then, based on a quantum job request 224, at least partially by the quantum system 201 (e.g., by the quantum operation component 203).

At 1234, the non-limiting method 1200 can comprise applying, by the quantum system (e.g., quantum system 201), the set of echo extender tones each having a second duration, wherein the second duration is different (e.g., longer or shorter) than the first duration. The application can be by the waveform generator 210, for example.

At 1236, the non-limiting method 1200 can comprise directing, by the system (e.g., execution component 318), the first iteration and the second iteration absent additional calibration of the respective echo extender tones of the respective modified pulse sequences employed for the first iteration and the second iteration. This directing can be performed at the classical noise extrapolation system 302 (e.g., by the execution component 318), and then, based on a quantum job request 224, at least partially by the quantum system 201 (e.g., by the quantum operation component 203).

At 1238, the non-limiting method 1200 can comprise obtaining, by the system (e.g., execution component 318 and/or extrapolation component 320), measurement readout data comprising respective noise mitigated outcomes for the first iteration and the second iteration. This obtaining can be performed at the classical noise extrapolation system 302.

At 1240, the non-limiting method 1200 can comprise estimating, by the system (e.g., extrapolation component 320), a final noise mitigated outcome based on interpolation of the noise mitigated outcomes for the first iteration and the second iteration. This estimating can be performed at the classical noise extrapolation system 302.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Where description indicates a process as taking place at a classical system or a quantum system, it is noted that in one or more other embodiments, such process can take place, at least partially, at the other of the classical system or the quantum system, where suitable and/or where such other system is configured to perform the process.

In summary, systems, computer-implemented methods, and/or computer program products to facilitate noise mitigation of a quantum circuit are provided. A quantum noise mitigation system can comprise a memory that stores, and a processor that executes, computer executable components comprising a pulse calibration component that, for controlling execution of a quantum gate of a quantum circuit, calibrates an echo extender tone parameter for a set of echo extender tones of an echo pulse sequence, wherein the pulse calibration component inserts the set of echo extender tones into the echo pulse sequence of an initial pulse sequence resulting in generation of a modified pulse sequence for use in controlling the execution of the quantum gate, and a parameterizing component that parameterizes the set of echo extender tones using a scalable stretch factor for stretching respective durations of the set of echo extender tones.

An advantage of such system, computer-implemented method and/or computer program product can be a reduced calibration overhead for calibration of a pulse sequence for use in executing varying iterations of the quantum circuit as compared to existing pulse sequence calibration frameworks. As a result, a same cross-resonance (CR) noise can be reliably amplified for each of the varying iterations without additional echo extender tone calibration when varying stretch factors are applied at the scalable stretch factor for different ones of the varying iterations. As still another result, the reduced calibration overhead can result in reduced overall quantum circuit calibration and execution time and thus increased usable coherency time of qubits of a quantum device being operated upon.

Moreover, the system, computer-implemented method and/or computer program product can result in determination of a more precise estimate of a zero-noise limit of the quantum circuit, further resulting in reduced negative effect of operation of the noise-mitigated quantum circuit on the qubits of the quantum device being operated upon. The reduced negative effects can comprise reduced impact of qubit decoherence and/or qubit energy relaxation of the one or more qubits of the quantum device being operated upon.

Indeed, in view of the one or more embodiments described herein, a practical application of the one or more systems, computer program products and/or computer-implemented methods described herein can be ability to execute a quantum circuit employing a pulse sequence constructed to mitigate the noise while requiring minimal overhead, including time for calibration, as compared to existing pulse sequence construction frameworks for noise mitigation of a quantum circuit. As a result, the reduced calibration overhead can result in reduced overall quantum circuit calibration and execution time and thus increased usable coherency time of qubits of a quantum device being operated upon. This is a useful and practical application of computers, thus providing enhanced (e.g., improved and/or optimized) operation of the hardware and/or software components of a target system (e.g., quantum system). Overall, such tools can constitute a concrete and tangible technical and/or physical improvement in the field of quantum computing.

Furthermore, one or more embodiments described herein can be employed in a real-world system based on the disclosed teachings. For example, one or more embodiments described herein can function in connection with a classical and/or quantum system to solve one or more real-world problems, such as related to fields of chemistry, physics and/or biology. Such problems can be represented as quantum algorithms, which quantum algorithms can be executed as one or more quantum circuits representing the quantum algorithms. In one example, a quantum system can receive as input a quantum job request and can measure a real-world qubit state of one or more qubits, such as superconducting qubits, of the quantum system by operating one or more quantum gates of a quantum circuit, where the one or more quantum gates can have quantum gate noise associated therewith mitigated by one or more frameworks described herein.

Moreover, a device and/or method described herein can be implemented in one or more domains to enable scaled quantum circuit gate noise mitigation for a plurality of gates of one or more quantum circuits at least partially in parallel with one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide quantum gate noise mitigation, such as relative to quantum circuit execution, as compared to existing systems and/or techniques. Systems, computer-implemented methods and/or computer program products facilitating performance of these processes are of great utility in the field of quantum circuit execution and/or quantum algorithm execution and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively characterize noise of a quantum gate, including execution of the quantum gate to perform the noise extrapolation, as the one or more embodiments described herein can facilitate this process. And, neither can the human mind nor a human with pen and paper perform one or more of these processes/operations, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

To provide additional summary, a listing of embodiments and features thereof is next provided.

A system, comprising: a memory that stores computer executable components; and a processor that executes the computer executable components stored in the memory for mitigating noise of a quantum circuit, wherein the computer executable components comprise: a pulse calibration component that, for controlling execution of a quantum gate of a quantum circuit, calibrates an echo extender tone parameter for a set of echo extender tones of an echo pulse sequence, wherein the pulse calibration component inserts the set of echo extender tones into the echo pulse sequence of an initial pulse sequence resulting in generation of a modified pulse sequence for use in controlling the execution of the quantum gate; and a parameterizing component that parameterizes the set of echo extender tones using a scalable stretch factor for stretching respective durations of the set of echo extender tones.

The system of the previous paragraph, wherein the pulse calibration component further calibrates a controlled-NOT (CNOT) gate generated from a cross-resonance (CR) interaction, and employs the amplitude of the pulse driving the CR interaction as an amplitude of a positive tone of the echo pulse sequence of the modified pulse sequence.

The system of any previous paragraph, wherein the calibrating the echo extender tone parameter further comprises executing a rough calibration of the echo extender tone parameter by directing execution of the plurality of iterations of an echo extender tone, of the set of echo extender tones, and based on a result of the rough calibration, performing a fine calibration of the echo extender tone parameter at a higher granulation than a granulation of the rough calibration.

The system of any previous paragraph, wherein the calibrating the echo extender tone parameter further comprises based on an echo extender tone amplitude resulting from the fine calibration, determining whether rotation of a target qubit to which the echo extender tone is applied satisfies a rotation threshold, and wherein the rotation threshold is satisfied, employing the echo extender tone amplitude resulting from the fine calibration, or wherein the rotation threshold is not satisfied, performing additional fine calibration of the echo extender tone amplitude.

The system of any previous paragraph, wherein the computer executable components further comprise: an execution component that directs a first iteration of execution of the quantum circuit employing the modified pulse sequence and a first stretch factor as the scalable stretch factor for each echo extender tone of the set of echo extender tones, wherein the execution component further directs a second iteration of execution of the quantum circuit employing the modified pulse sequence and a second stretch factor as the scalable stretch factor for each echo extender tone of the set of echo extender tones, wherein the second stretch factor is different than the first stretch factor, and wherein the first iteration and the second iteration are directed absent additional calibration of the corresponding echo extender tones of the respective modified pulse sequences employed for the first iteration and the second iteration.

The system of any previous paragraph, wherein, for the first iteration, use of the first stretch factor results in application of the set of echo extender tones each having a first duration, wherein, for the second iteration, use of the second stretch factor results in application of the set of echo extender tones each having a second duration, and wherein the second duration is different than the first duration.

The system of any previous paragraph, wherein the computer executable components further comprise: a compiling component that generates a stretched pulse schedule comprising a plurality of iterations of the modified pulse sequence, including the modified pulse sequence, each mapped by a sequence of basis gates being functions of the stretch factor, wherein different ones of the plurality of iterations of the modified pulse sequence employ different stretch factors as the scalable stretch factor for respective pairs of the echo extender tones, including the set of echo extender tones.

The system of any previous paragraph, wherein generating the stretched pulse schedule comprises generating, for a quantum gate of the quantum circuit, the sequence of basis gates, mapping the sequence of basis gates to the modified pulse sequence, and performing the generating of the sequence of basis gates and mapping of the sequence of basis gates for additional ones of the plurality of iterations of the modified pulse sequence, other than the modified pulse sequence, compiled by the compiling component.

A computer-implemented method for noise mitigation of a quantum circuit, the computer-implemented method comprising: for controlling execution of a quantum gate of a quantum circuit, calibrating, by a system operatively coupled to at least one processor, an echo extender tone parameter for a set of echo extender tones of an echo pulse sequence; inserting, by the system, the set of echo extender tones into the echo pulse sequence of an initial pulse sequence resulting in generation of a modified pulse sequence for use in controlling the execution of the quantum gate; and parameterizing, by the system, the set of echo extender tones using a scalable stretch factor for stretching respective durations of the set of echo extender tones.

The computer-implemented method of any previous paragraph, further comprising: calibrating, by the system, a controlled-NOT (CNOT) gate generated from a cross-resonance (CR) interaction; and employing, by the system, the amplitude of the pulse driving the CR interaction as an amplitude of a positive tone of the echo pulse sequence of the modified pulse sequence.

The computer-implemented method of any previous paragraph, wherein the calibrating the echo extender tone amplitude further comprises executing, by the system, a rough calibration of the echo extender tone parameter by directing execution of the plurality of iterations of an echo extender tone, of the set of echo extender tones, and based on a result of the rough calibration, performing, by the system, a fine calibration of the echo extender tone parameter at a higher granulation than a granulation of the rough calibration.

The computer-implemented method of any previous paragraph, wherein the calibrating the echo extender tone amplitude further comprises based on an echo extender tone amplitude resulting from the fine calibration, determining, by the system, whether rotation of a target qubit to which the echo extender tone is applied satisfies a rotation threshold, and wherein the rotation threshold is satisfied, employing, by the system, the echo extender tone amplitude resulting from the fine calibration, or wherein the rotation threshold is not satisfied, performing, by the system, additional fine calibration of the echo extender tone amplitude.

The computer-implemented method of any previous paragraph, further comprising: directing, by the system, a first iteration of execution of the quantum circuit employing the modified pulse sequence and a first stretch factor as the scalable stretch factor for each echo extender tone of the set of echo extender tones; and directing, by the system, a second iteration of execution of the quantum circuit employing the modified pulse sequence and a second stretch factor as the scalable stretch factor for each echo extender tone of the set of echo extender tones, wherein the second stretch factor is different than the first stretch factor, and wherein the first iteration and the second iteration are directed absent additional calibration of the corresponding echo extender tones of the respective modified pulse sequences employed for the first iteration and the second iteration.

The computer-implemented method of any previous paragraph, wherein, for the first iteration, use of the first stretch factor results in application of the set of echo extender tones each having a first duration, wherein, for the second iteration, use of the second stretch factor results in application of the set of echo extender tones each having a second duration, and wherein the second duration is different than the first duration.

A computer program product facilitating a process for noise mitigation of a quantum circuit, the computer program product comprising a computer readable storage medium having program instructions embodied therewith, the program instructions executable by a processor to cause the processor to: for controlling execution of a quantum gate of a quantum circuit, calibrate, by the processor, an echo extender tone parameter for a set of echo extender tones of an echo pulse sequence; insert, by the processor, the set of echo extender tones into the echo pulse sequence of an initial pulse sequence resulting in generation of a modified pulse sequence for use in controlling the execution of the quantum gate; and parameterize, by the processor, the set of echo extender tones using a scalable stretch factor for stretching respective durations of the set of echo extender tones.

The computer program product of any previous paragraph, wherein the program instructions are executable by the processor to further cause the processor to: calibrate, by the processor, a controlled-NOT (CNOT) gate generated from a cross-resonance (CR) interaction; and employ, by the processor, the amplitude of the pulse driving the CR interaction as an amplitude of a positive tone of the echo pulse sequence of the modified pulse sequence.

The computer program product of any previous paragraph, wherein the calibrating the echo extender tone amplitude further comprises executing, by the processor, a rough calibration of the echo extender tone parameter by directing execution of the plurality of iterations of an echo extender tone, of the set of echo extender tones, and based on a result of the rough calibration, performing, by the processor, a fine calibration of the echo extender tone parameter at a higher granulation than a granulation of the rough calibration.

The computer program product of any previous paragraph, wherein the calibrating the echo extender tone amplitude further comprises based on an echo extender tone amplitude resulting from the fine calibration, determining, by the processor, whether rotation of a target qubit to which the echo extender tone is applied satisfies a rotation threshold, and wherein the rotation threshold is satisfied, employing, by the processor, the echo extender tone amplitude resulting from the fine calibration, or wherein the rotation threshold is not satisfied, performing, by the processor, additional fine calibration of the echo extender tone amplitude.

The computer program product of any previous paragraph, wherein the program instructions are executable by the processor to further cause the processor to: direct, by the processor, a first iteration of execution of the quantum circuit employing the modified pulse sequence and a first stretch factor as the scalable stretch factor for each echo extender tone of the set of echo extender tones; and direct, by the processor, a second iteration of execution of the quantum circuit employing the modified pulse sequence and a second stretch factor as the scalable stretch factor for each echo extender tone of the set of echo extender tones, wherein the second stretch factor is different than the first stretch factor, and wherein the first iteration and the second iteration are directed absent additional calibration of the corresponding echo extender tones of the respective modified pulse sequences employed for the first iteration and the second iteration.

The computer program product of any previous paragraph, wherein, for the first iteration, use of the first stretch factor results in application of the set of echo extender tones each having a first duration, wherein, for the second iteration, use of the second stretch factor results in application of the set of echo extender tones each having a second duration, and wherein the second duration is different than the first duration.

Turning next to FIG. 15, a detailed description is provided of additional context for the one or more embodiments described herein at FIGS. 1-14.

FIG. 15 and the following discussion are intended to provide a brief, general description of a suitable computing environment 1500 in which one or more embodiments described herein at FIGS. 1-14 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1500 contains an example of an environment for the execution of at least some of the computer code involved in performing the inventive methods, such as translation of an original source code based on a configuration of a target system by the noise extrapolation code 1580. In addition to block 1580, computing environment 1500 includes, for example, computer 1501, wide area network (WAN) 1502, end user device (EUD) 1503, remote server 1504, public cloud 1505, and private cloud 1506. In this embodiment, computer 1501 includes processor set 1510 (including processing circuitry 1520 and cache 1521), communication fabric 1511, volatile memory 1512, persistent storage 1513 (including operating system 1522 and block 1580, as identified above), peripheral device set 1514 (including user interface (UI), device set 1523, storage 1524, and Internet of Things (IoT) sensor set 1525), and network module 1515. Remote server 1504 includes remote database 1530. Public cloud 1505 includes gateway 1540, cloud orchestration module 1541, host physical machine set 1542, virtual machine set 1543, and container set 1544.

COMPUTER 1501 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1530. As is well understood in the art of computer technology, and depending upon the technology, performance of a computer-implemented method can be distributed among multiple computers and/or between multiple locations. On the other hand, in this presentation of computing environment 1500, detailed discussion is focused on a single computer, specifically computer 1501, to keep the presentation as simple as possible. Computer 1501 can be located in a cloud, even though it is not shown in a cloud in FIG. 15. On the other hand, computer 1501 is not required to be in a cloud except to any extent as can be affirmatively indicated.

PROCESSOR SET 1510 includes one, or more, computer processors of any type now known or to be developed in the future. Processing circuitry 1520 can be distributed over multiple packages, for example, multiple, coordinated integrated circuit chips. Processing circuitry 1520 can implement multiple processor threads and/or multiple processor cores. Cache 1521 is memory that is located in the processor chip package(s) and is typically used for data or code that should be available for rapid access by the threads or cores running on processor set 1510. Cache memories are typically organized into multiple levels depending upon relative proximity to the processing circuitry. Alternatively, some, or all, of the cache for the processor set can be located "off chip." In some computing environments, processor set 1510 can be designed for working with qubits and performing quantum computing.

Computer readable program instructions are typically loaded onto computer 1501 to cause a series of operational steps to be performed by processor set 1510 of computer 1501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1521 and the other storage media discussed below. The program instructions, and associated data, are accessed by processor set 1510 to control and direct performance of the inventive methods. In computing environment 1500, at least some of the instructions for performing the inventive methods can be stored in block 1580 in persistent storage 1513.

COMMUNICATION FABRIC 1511 is the signal conduction path that allows the various components of computer 1501 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1512 is any type of volatile memory now known or to be developed in the future. Examples include dynamic type random access memory (RAM) or static type RAM. Typically, the volatile memory is characterized by random access, but this is not required unless affirmatively indicated. In computer 1501, the volatile memory 1512 is located in a single package and is internal to computer 1501, but, alternatively or additionally, the volatile memory can be distributed over multiple packages and/or located externally with respect to computer 1501.

PERSISTENT STORAGE 1513 is any form of non-volatile storage for computers that is now known or to be developed in the future. The non-volatility of this storage means that the stored data is maintained regardless of whether power is being supplied to computer 1501 and/or directly to persistent storage 1513. Persistent storage 1513 can be a read only memory (ROM), but typically at least a portion of the persistent storage allows writing of data, deletion of data and rewriting of data. Some familiar forms of persistent storage include magnetic disks and solid-state storage devices. Operating system 1522 can take several forms, such as various known proprietary operating systems or open-source Portable Operating System Interface type operating systems that employ a kernel. The code included in block 1580 typically includes at least some of the computer code involved in performing the inventive methods.

PERIPHERAL DEVICE SET 1514 includes the set of peripheral devices of computer 1501. Data communication connections between the peripheral devices and the other components of computer 1501 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1523 can include components such as a display screen, speaker, microphone, wearable devices (such as goggles and smart watches), keyboard, mouse, printer, touchpad, game controllers, and haptic devices. Storage 1524 is external storage, such as an external hard drive, or insertable storage, such as an SD card. Storage 1524 can be persistent and/or volatile. In some embodiments, storage 1524 can take the form of a quantum computing storage device for storing data in the form of qubits. In embodiments where computer 1501 is required to have a large amount of storage (for example, where computer 1501 locally stores and manages a large database) then this storage can be provided by peripheral storage devices designed for storing large amounts of data, such as a storage area network (SAN) that is shared by multiple, geographically distributed computers. IoT sensor set 1525 is made up of sensors that can be used in Internet of Things applications. For example, one sensor can be a thermometer and another sensor can be a motion detector.

NETWORK MODULE 1515 is the collection of computer software, hardware, and firmware that allows computer 1501 to communicate with other computers through WAN 1502. Network module 1515 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1515 are performed on the same physical hardware device. In other embodiments (for example, embodiments that utilize software-defined networking (SDN)), the control functions and the forwarding functions of network module 1515 are performed on physically separate devices, such that the control functions manage several different network hardware devices. Computer readable program instructions for performing the inventive methods can typically be downloaded to computer 1501 from an external computer or external storage device through a network adapter card or network interface included in network module 1515.

WAN 1502 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1503 is any computer system that is used and controlled by an end user (for example, a customer of an enterprise that operates computer 1501) and can take any of the forms discussed above in connection with computer 1501. EUD 1503 typically receives helpful and useful data from the operations of computer 1501. For example, in a hypothetical case where computer 1501 is designed to provide a recommendation to an end user, this recommendation would typically be communicated from network module 1515 of computer 1501 through WAN 1502 to EUD 1503. In this way, EUD 1503 can display, or otherwise present, the recommendation to an end user. In some embodiments, EUD 1503 can be a client device, such as thin client, heavy client, mainframe computer and/or desktop computer.

REMOTE SERVER 1504 is any computer system that serves at least some data and/or functionality to computer 1501. Remote server 1504 can be controlled and used by the same entity that operates computer 1501. Remote server 1504 represents the machine(s) that collect and store helpful and useful data for use by other computers, such as computer 1501. For example, in a hypothetical case where computer 1501 is designed and programmed to provide a recommendation based on historical data, then this historical data can be provided to computer 1501 from remote database 1530 of remote server 1504.

PUBLIC CLOUD 1505 is any computer system available for use by multiple entities that provides on-demand availability of computer system resources and/or other computer capabilities, especially data storage (cloud storage) and computing power, without direct active management by the scale. The direct and active management of the computing resources of public cloud 1505 is performed by the computer hardware and/or software of cloud orchestration module 1541. The computing resources provided by public cloud 1505 are typically implemented by virtual computing environments that run on various computers making up the computers of host physical machine set 1542, which is the universe of physical computers in and/or available to public cloud 1505. The virtual computing environments (VCEs) typically take the form of virtual machines from virtual machine set 1543 and/or containers from container set 1544. It is understood that these VCEs can be stored as images and can be transferred among and between the various physical machine hosts, either as images or after instantiation of the VCE. Cloud orchestration module 1541 manages the transfer and storage of images, deploys new instantiations of VCEs and manages active instantiations of VCE deployments. Gateway 1540 is the collection of computer software, hardware and firmware allowing public cloud 1505 to communicate through WAN 1502.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1506 is similar to public cloud 1505, except that the computing resources are only available for use by a single enterprise. While private cloud 1506 is depicted as being in communication with WAN 1502, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1505 and private cloud 1506 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the “C” programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory that stores computer executable components; and a processor that executes the computer executable components stored in the memory for mitigating noise of a quantum circuit, wherein the computer executable components comprise:

a pulse calibration component that, for controlling execution of a quantum gate of a quantum circuit, calibrates an echo extender tone parameter for a set of echo extender tones of an echo pulse sequence, wherein the pulse calibration component inserts the set of echo extender tones into the echo pulse sequence of an initial pulse sequence resulting in generation of a modified pulse sequence for use in controlling the execution of the quantum gate; and a parameterizing component that parameterizes the set of echo extender tones using a scalable stretch factor for stretching respective durations of the set of echo extender tones.

2. The system of claim 1, wherein the pulse calibration component further calibrates a controlled-NOT (CNOT) gate generated from a cross-resonance (CR) interaction, and employs the amplitude of the pulse driving the CR interaction as an amplitude of a positive tone of the echo pulse sequence of the modified pulse sequence.

3. The system of claim 1, wherein the calibrating the echo extender tone parameter further comprises executing a rough calibration of the echo extender tone parameter by directing execution of the plurality of iterations of an echo extender tone, of the set of echo extender tones, and based on a result of the rough calibration, performing a fine calibration of the echo extender tone parameter at a higher granulation than a granulation of the rough calibration.

4. The system of claim 3, wherein the calibrating the echo extender tone parameter further comprises based on an echo extender tone amplitude resulting from the fine calibration, determining whether rotation of a target qubit to which the echo extender tone is applied satisfies a rotation threshold, and wherein the rotation threshold is satisfied, employing the echo extender tone amplitude resulting from the fine calibration, or wherein the rotation threshold is not satisfied, performing additional fine calibration of the echo extender tone amplitude.

5. The system of claim 1, wherein the computer executable components further comprise:

an execution component that directs a first iteration of execution of the quantum circuit employing the modified pulse sequence and a first stretch factor as the scalable stretch factor for each echo extender tone of the set of echo extender tones, wherein the execution component further directs a second iteration of execution of the quantum circuit employing the modified pulse sequence and a second stretch factor as the scalable stretch factor for each echo extender tone of the set of echo extender tones, wherein the second stretch factor is different than the first stretch factor, and wherein the first iteration and the second iteration are directed absent additional calibration of the corresponding echo extender tones of the respective modified pulse sequences employed for the first iteration and the second iteration.

6. The system of claim 5, wherein, for the first iteration, use of the first stretch factor results in application of the set of echo extender tones each having a first duration, wherein, for the second iteration, use of the second stretch factor results in application of the set of echo extender tones each having a second duration, and wherein the second duration is different than the first duration.

7. The system of claim 1, wherein the computer executable components further comprise:

a compiling component that generates a stretched pulse schedule comprising a plurality of iterations of the modified pulse sequence, including the modified pulse sequence, each mapped by a sequence of basis gates being functions of the stretch factor, wherein different ones of the plurality of iterations of the modified pulse sequence employ different stretch factors as the scalable stretch factor for respective pairs of the echo extender tones, including the set of echo extender tones.

8. The system of claim 7, wherein generating the stretched pulse schedule comprises generating, for a quantum gate of the quantum circuit, the sequence of basis gates, and mapping the sequence of basis gates to the modified pulse sequence.

9. A computer-implemented method for noise mitigation of a quantum circuit, the computer-implemented method comprising:

for controlling execution of a quantum gate of a quantum circuit, calibrating, by a system operatively coupled to at least one processor, an echo extender tone parameter for a set of echo extender tones of an echo pulse sequence;

inserting, by the system, the set of echo extender tones into the echo pulse sequence of an initial pulse sequence resulting in generation of a modified pulse sequence for use in controlling the execution of the quantum gate; and parameterizing, by the system, the set of echo extender tones using a scalable stretch factor for stretching respective durations of the set of echo extender tones.

10. The computer-implemented method of claim 9, further comprising:

calibrating, by the system, a controlled-NOT (CNOT) gate generated from a cross-resonance (CR) interaction; and employing, by the system, the amplitude of the pulse driving the CR interaction as an amplitude of a positive tone of the echo pulse sequence of the modified pulse sequence.

11. The computer-implemented method of claim 9, wherein the calibrating the echo extender tone amplitude comprises executing, by the system, a rough calibration of the echo extender tone parameter by directing execution of the plurality of iterations of an echo extender tone, of the set of echo extender tones, and based on a result of the rough calibration, performing, by the system, a fine calibration of the echo extender tone parameter at a higher granulation than a granulation of the rough calibration.

12. The computer-implemented method of claim 11, wherein the calibrating the echo extender tone amplitude further comprises based on an echo extender tone amplitude resulting from the fine calibration, determining, by the system, whether rotation of a target qubit to which the echo extender tone is applied satisfies a rotation threshold, and wherein the rotation threshold is satisfied, employing, by the system, the echo extender tone amplitude resulting from the fine calibration, or wherein the rotation threshold is not satisfied, performing, by the system, additional fine calibration of the echo extender tone amplitude.

13. The computer-implemented method of claim 9, further comprising:

directing, by the system, a first iteration of execution of the quantum circuit employing the modified pulse sequence and a first stretch factor as the scalable stretch factor for each echo extender tone of the set of echo extender tones; and directing, by the system, a second iteration of execution of the quantum circuit employing the modified pulse sequence and a second stretch factor as the scalable stretch factor for each echo extender tone of the set of echo extender tones, wherein the second stretch factor is different than the first stretch factor, and wherein the first iteration and the second iteration are directed absent additional calibration of the corresponding echo extender tones of the respective modified pulse sequences employed for the first iteration and the second iteration.

14. The computer-implemented method of claim 13, wherein, for the first iteration, use of the first stretch factor results in application of the set of echo extender tones each having a first duration, wherein, for the second iteration, use of the second stretch factor results in application of the set of echo extender tones each having a second duration, and wherein the second duration is different than the first duration.

15. A computer program product facilitating a process for noise mitigation of a quantum circuit, the computer program product comprising a computer readable storage medium having program instructions embodied therewith, the program instructions executable by a processor to cause the processor to:

for controlling execution of a quantum gate of a quantum circuit, calibrate, by the processor, an echo extender tone parameter for a set of echo extender tones of an echo pulse sequence;

insert, by the processor, the set of echo extender tones into the echo pulse sequence of an initial pulse sequence resulting in generation of a modified pulse sequence for use in controlling the execution of the quantum gate; and parameterize, by the processor, the set of echo extender tones using a scalable stretch factor for stretching respective durations of the set of echo extender tones.

16. The computer program product of claim 15, wherein the program instructions are executable by the processor to further cause the processor to:

calibrate, by the processor, a controlled-NOT (CNOT) gate generated from a cross-resonance (CR) interaction; and employ, by the processor, the amplitude of the pulse driving the CR interaction as an amplitude of a positive tone of the echo pulse sequence of the modified pulse sequence.

17. The computer program product of claim 15, wherein the calibrating the echo extender tone amplitude further comprises executing, by the processor, a rough calibration of the echo extender tone parameter by directing execution of the plurality of iterations of an echo extender tone, of the set of echo extender tones, and based on a result of the rough calibration, performing, by the processor, a fine calibration of the echo extender tone parameter at a higher granulation than a granulation of the rough calibration.

18. The computer program product of claim 17, wherein the calibrating the echo extender tone amplitude further comprises based on an echo extender tone amplitude resulting from the fine calibration, determining, by the processor, whether rotation of a target qubit to which the echo extender tone is applied satisfies a rotation threshold, and wherein the rotation threshold is satisfied, employing, by the processor, the echo extender tone amplitude resulting from the fine calibration, or wherein the rotation threshold is not satisfied, performing, by the processor, additional fine calibration of the echo extender tone amplitude.

19. The computer program product of claim 15, wherein the program instructions are executable by the processor to further cause the processor to:

direct, by the processor, a first iteration of execution of the quantum circuit employing the modified pulse sequence and a first stretch factor as the scalable stretch factor for each echo extender tone of the set of echo extender tones; and direct, by the processor, a second iteration of execution of the quantum circuit employing the modified pulse sequence and a second stretch factor as the scalable stretch factor for each echo extender tone of the set of echo extender tones, wherein the second stretch factor is different than the first stretch factor, and wherein the first iteration and the second iteration are directed absent additional calibration of the corresponding echo extender tones of the respective modified pulse sequences employed for the first iteration and the second iteration.

20. The computer program product of claim 19, wherein, for the first iteration, use of the first stretch factor results in application of the set of echo extender tones each having a first duration, wherein, for the second iteration, use of the second stretch factor results in application of the set of echo extender tones each having a second duration, and wherein the second duration is different than the first duration.

* * * * *